US006394347B1

(12) United States Patent
Kitai et al.

(10) Patent No.: US 6,394,347 B1
(45) Date of Patent: *May 28, 2002

(54) APPARATUS AND SYSTEM FOR AT LEAST RECORDING INFORMATION ON OR REPRODUCING INFORMATION FROM A CARD-SHAPED RECORDING MEDIUM

(75) Inventors: Hiroto Kitai, Tokyo; Kengo Emoto, Kawasaki, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,787

(22) Filed: Nov. 12, 1998

(30) Foreign Application Priority Data

Nov. 13, 1997 (JP) .......................................... 09-311977
Nov. 21, 1997 (JP) .......................................... 09-321508

(51) Int. Cl.⁷ ................................................. G06K 7/00
(52) U.S. Cl. ........................ 235/440; 235/454; 235/492; 235/435; 235/487; 235/436
(58) Field of Search ................................ 235/440, 487, 235/492, 435, 436, 454, 462.22, 462.23

(56) References Cited

U.S. PATENT DOCUMENTS

| | | | |
|---|---|---|---|
| 5,296,689 A | * | 3/1994 | Reddersen et al. .......... 235/467 |
| 5,332,890 A | * | 7/1994 | Kitahara ...................... 235/454 |
| 5,514,856 A | * | 5/1996 | Kitahara et al. ............. 235/454 |
| 5,530,232 A | * | 6/1996 | Taylor ......................... 235/380 |
| 5,638,345 A | * | 6/1997 | Hosoya ....................... 235/454 |
| 6,021,393 A | * | 2/2000 | Honda et al. ................ 235/487 |

FOREIGN PATENT DOCUMENTS

| | | |
|---|---|---|
| EP | 525642 | 2/1993 |
| EP | 678861 | 10/1995 |
| EP | 0 892 399 A2 * | 1/1999 |
| JP | 08161790 | 6/1996 |

* cited by examiner

Primary Examiner—Thien M. Le
Assistant Examiner—Uyen-Chau Le
(74) Attorney, Agent, or Firm—Fitzpatrick, Cella, Harper & Scinto

(57) ABSTRACT

Information is recorded on or reproduced from a hybrid card having an optical recording region and a non-contact type IC memory region connected to a card-side antenna coil. The information recording and/or reproduction is effected by an apparatus including an optical head for scanning the optical recording region with a light beam, a control circuit for exerting tracking and focusing control on the light beam, an apparatus-side antenna coil to be disposed opposite to the card-side antenna coil, a reader/writer for storing information in or reading information from the IC memory region by way of electromagnetic induction coupling between the card-side antenna coil and the apparatus-side antenna coil, and a processing circuit for controlling the operation of the optical head, the control circuit and the reader/writer. The processing circuit controls the read/writer so as not to store information in nor read information from the IC memory region during the period there the control circuit is exerting tracking control or focusing control.

12 Claims, 16 Drawing Sheets

APPARATUS AND SYSTEM FOR AT LEAST RECORDING INFORMATION ON OR REPRODUCING INFORMATION FROM A CARD-SHAPED RECORDING MEDIUM

BACKGROUND OF THE INVENTION

1. Field of the Invention

This invention relates to an apparatus and a system for at least recording information on or reproducing information from a card-shaped recording medium.

2. Related Background Art

There have been a number of optical information recording/reproducing apparatus developed recently and adapted to use a recording medium, such as an optical file or a compact disk. However, attention is now being paid to card-shaped optical information recording media (hereinafter referred to as optical cards) that are dimensionally small and hence easy to carry but have a large memory capacity. Optical cards are advantageous not only because they have a large memory capacity but also because they can be duplicated with ease at low cost. Other advantages of optical cards include that they are writing-once-type recording media and hence the information recorded thereon can hardly be altered fraudulently to make them highly reliable. A large storage capacity optical card can be made as small and lightweight as a credit card and therefore there is anticipated a large demand for such optical cards.

An optical card is a medium on which information can be recorded by irradiating it with light and from which information can be retrieved also by irradiating it with light. More specifically, a finely converged light spot is moved back and forth on the optical card to record information on and reproduce information from it. Information can be recorded in the form of rows of optically detectable recording pits by modulating the light spot according to the information to be recorded. Control techniques such as auto-focusing (hereinafter referred to as AF) control and auto-tracking (hereinafter referred to as AT) control are known as means for accurately recording information in a predetermined region. With AT control, the light spot is positionally controlled in a direction perpendicular to its scanning direction on the surface of the optical card. AF control is used to positionally control the light spot in a direction vertical to the surface of the optical card. Of course, these control techniques are also required to reproduce information from the optical card.

In recent years, IC cards are also attracting attention because of the information security feature they have. Two types of IC cards are known to date; the contact type and the non-contact type. A non-contact type IC card requires the use of an electromagnetic wave as a medium for transmitting information from the IC card and a recording/reproducing apparatus and vice versa. A pair of coils are arranged face to face between the IC card and the apparatus to generate and receive an induced field, which field is used as a medium for transmitting information. An IC card typically comprises an IC chip and a coil arranged as laminate by using vinyl chloride or some other appropriate material for keeping them in shape and binding them together. It may or may not contain a power source, although battery-less type IC cards containing no power source for recording/reproducing operations are in the main stream because they can be made very thin and have a long service life (but they may contain a battery necessary for preventing the stored information from expiring).

The applicant of the present patent application has invented a hybrid card having both the advantages of an optical card and those of an IC card and comprising a non-contact IC memory region and an optical recording region and also a hybrid reader/writer for recording information on and reproducing information from such a hybrid card and applied for patent for the invention in Japanese Patent Application No. 9-192366.

SUMMARY OF THE INVENTION

The object of the present invention is to provide an apparatus and a system adapted to at least record information on or reproduce information from such a hybrid card. According to the invention, it is possible to realize an apparatus and a system with which the focusing control and the tracking control of the optical beam irradiated on the optical recording region of a hybrid card is minimally affected by the electromagnetic induction that arises in the operation of storing information in or retrieving the information stored in the IC memory region of the hybrid card.

According to an aspect of the invention, the above object is achieved by providing an apparatus for at least recording information on or reproducing information from a card-shaped recording medium having an optical recording region including a track, an IC memory region and a communication antenna coil connected to the IC memory region, the apparatus comprising:

an optical head unit for irradiating the optical recording region of the medium with a focused beam of light in order to at least record information on or reproduce information from it;

a control circuit for exerting at least tracking control or focusing control on the beam of light;

an apparatus-side antenna coil arranged opposite the antenna coil of the medium;

a reader/writer for at least storing information in or reading information from the IC memory region of the medium by way of the apparatus-side antenna coil; and a processing circuit for controlling the operation of the optical head unit, the control circuit and the reader/writer;

the processing circuit controlling the reader/writer so as not to store information in nor read information from the IC memory region of the medium during the period where the control circuit is exerting at least tracking control or focusing control on the beam of light.

According to another aspect of the invention, the above object is achieved by providing a system for at least recording or reproducing information comprising:

a card-shaped recording medium including an optical recording region having a plurality of tracks, an IC memory region, a telecommunication antenna coil connected to the IC memory region, the medium having an area where part of the optical recording region is overlapped by the antenna coil in a direction perpendicular to the surface of the medium;

an optical head for irradiating a converged beam of light on the optical recording region of the medium for at least recording or reproducing information;

a control circuit for exerting at least tracking control or focusing control on the optical beam;

an apparatus-side antenna coil disposed vis-a-vis the antenna coil of the medium;

a reader/writer for at least storing information in or reproducing information from the IC memory region of the medium by way of the apparatus-side antenna coil; and a control circuit for controlling the operation of the optical head so as to at least record information in or reproduce information from an area of the optical recording region of the medium other than the area overlapped by the antenna coil.

DESCRIPTION OF THE PREFERRED EMBODIMENTS

To begin with, a card-shaped recording medium (hereinafter referred to as hybrid card) having an optical recording region, an IC memory region and a communication antenna coil connected to the IC memory region and adapted to be used for the purpose of the invention will be described.

Figure 1A:
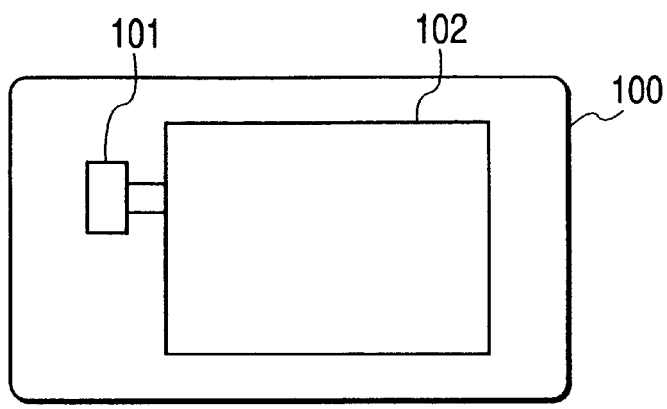
FIGS. 1A and 1B are schematic plan views of a hybrid card that can be used with an apparatus and a system according to the invention.
Figure 1B:
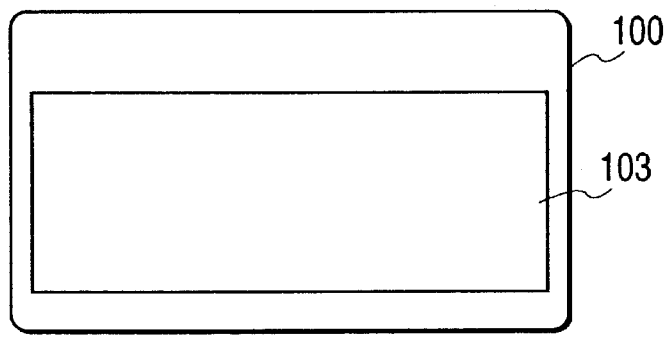

FIGS. 1A and 1B are schematic plan views of such a hybrid card. FIG. 1A shows the side (front side) of the hybrid card where the non-contact IC memory region is arranged while FIG. 1B shows the side (rear side) of the hybrid card where the optical recording region is arranged.

Firstly, the IC memory region of the hybrid card will be described by referring to FIG. 1A. In FIG. 1A, reference numeral 100 denotes the hybrid card and reference numeral 101 denotes the IC memory region comprising a CPU, a memory and a power source. The IC memory region 101 is connected to an antenna coil 102. The IC memory region 101 and the antenna coil 102 are incorporated as a laminate so that they may be kept in shape and bound together.

Figure 2:
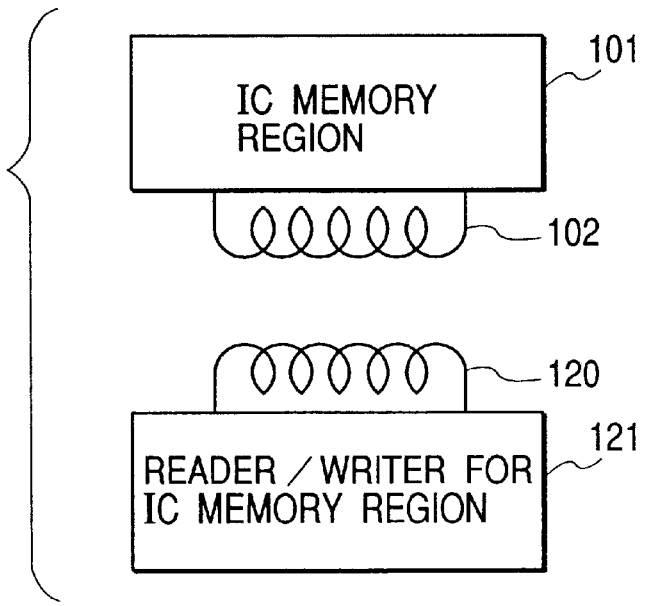
FIG. 2 is a schematic illustration showing how information is stored in the IC memory region of a hybrid card and how information is read from the IC memory region.

Now, the principle underlying the operation of recording information in and reproducing information from the IC memory region 101 of a hybrid card 100 will be described by referring to FIG. 2. In FIG. 2, reference numeral 101 denotes the IC memory region and reference numeral 102 denotes the antenna coil of the hybrid card, which are identical respectively with the IC memory region 101 and the antenna coil 102 of FIG. 9. Reference numeral 120 denotes an antenna coil of an apparatus according to the invention that is electromagnetically coupled with the antenna coil 102 and reference numeral 121 denotes a reader/writer of the apparatus to be used for the IC memory region.

When recording information on the hybrid card, a radio-frequency current with a frequency of several hundred kHz is applied to the antenna coil 120 according to the recording command sent from the reader/writer 121 for the IC memory region. As a result, the magnetic field is subjected to a change in the vicinity of the antenna coil so that a signal identical with the one applied to the antenna coil 120 is induced in the antenna coil 102 of the hybrid card. The signal induced in the antenna coil 102 is taken into the IC memory region 101 that comprises a CPU, a memory and a power supply circuit, which identifies the write command and the information to be recorded, which information is then stored in the memory.

When reproducing information from the hybrid card, a reproduction command from the reader/writer 121 for the IC memory region is transmitted to the antenna coil 102 of the hybrid card by way of the antenna coil 120 of the reader/writer 121 for the IC memory region as in the case of recording information and information is read from the specified memory area of the IC memory region 101. The information that has been read is then modulated by an oscillator (not shown) of the IC memory region 101 and transmitted to the antenna coil 120 of the reader/writer 121 for the IC memory region by electromagnetic induction by way of the antenna coil 102. The transmitted information is then demodulated by the reader/writer 121 for the IC memory region. Thus, information can be recorded and reproduced by means of electromagnetic induction as described above briefly.

Figure 3:
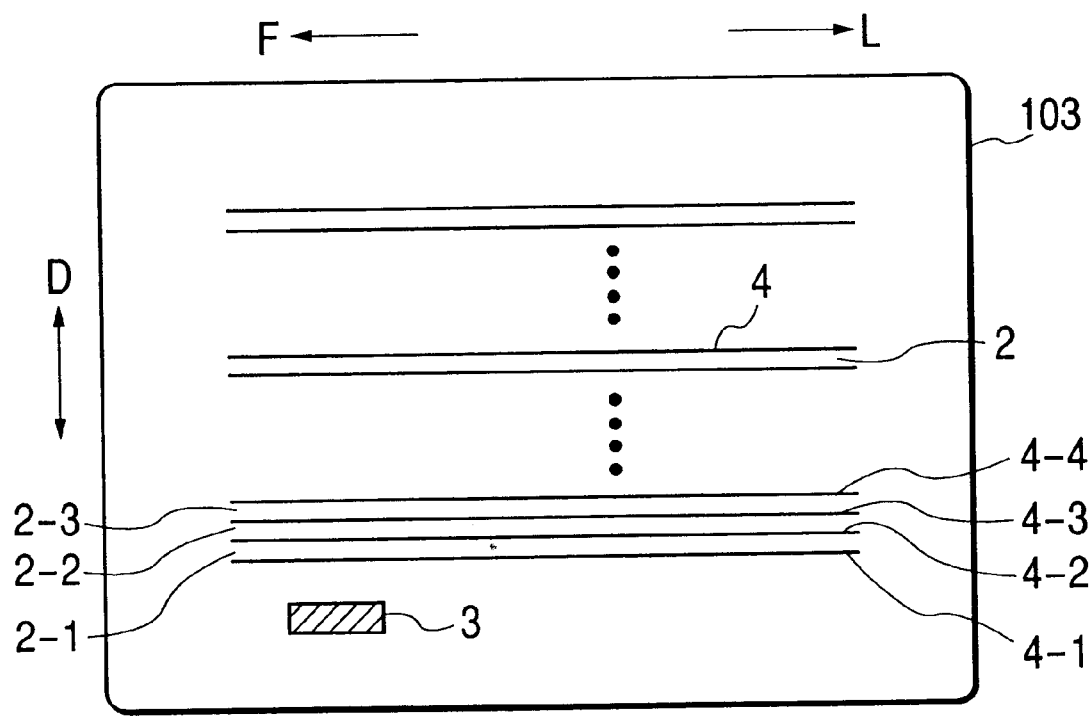
FIG. 3 is a schematic illustration of the configuration of the optical recording surface of a hybrid card.

Now, the optical recording region 103 of the hybrid card will be described. Referring to FIG. 1B, an optical recording region 103 is arranged on the rear surface of the hybrid card 100. FIG. 3 is a schematic illustration of the configuration of the optical recording region 103 of a hybrid card. Referring to FIG. 3, a large number of information tracks 2 and also a large number of tracking tracks 4 are arranged alternately on the recording surface of the optical recording region 103. Additionally, a home position 3 is provided in the optical recording region 103 to operate as a reference position when accessing any of the information tracks 2. Note that the information tracks 2 are denoted by 2-1, 2-2, 2-3, . . . , the affixed number increasing as a function of the distance from the home position. Likewise, the tracking tracks arranged alternately with the information tracks 2 are denoted by 4-1, 4-2, 4-3. The tracking tracks are used as so many guides in the AT control operation for controlling the light spot so as not to deviate from the target information track when scanning the information track for recording or reproducing information.

The AT control operation is an operation performed by a servo control circuit to detect any deviation (AT error) of the light spot produced by the optical head unit from the target information track and feed back the detected deviation to the tracking actuator that drives the objective lens along the tracking direction. In other words, the objective lens is driven to move along the tracking direction (D-direction) relative to the optical head unit itself so that the light spot may not deviate from the target information track.

The AF control operation is an operation conducted on the objective lens in order to make the light spot have an appropriate size (focused) on the recording surface of the hybrid card during the scanning of the information tracks with the light spot. With the AF control operation, any deviation (AF error) of the light spot produced by the optical head unit from a focused condition is detected and the detection signal representing the detected error is fed back to the focus actuator for driving the objective lens along the optical axis of the lens so that the light spot may be focused on the recording layer of the hybrid card by moving the objective lens relative to the optical head unit main body.

Figure 4:
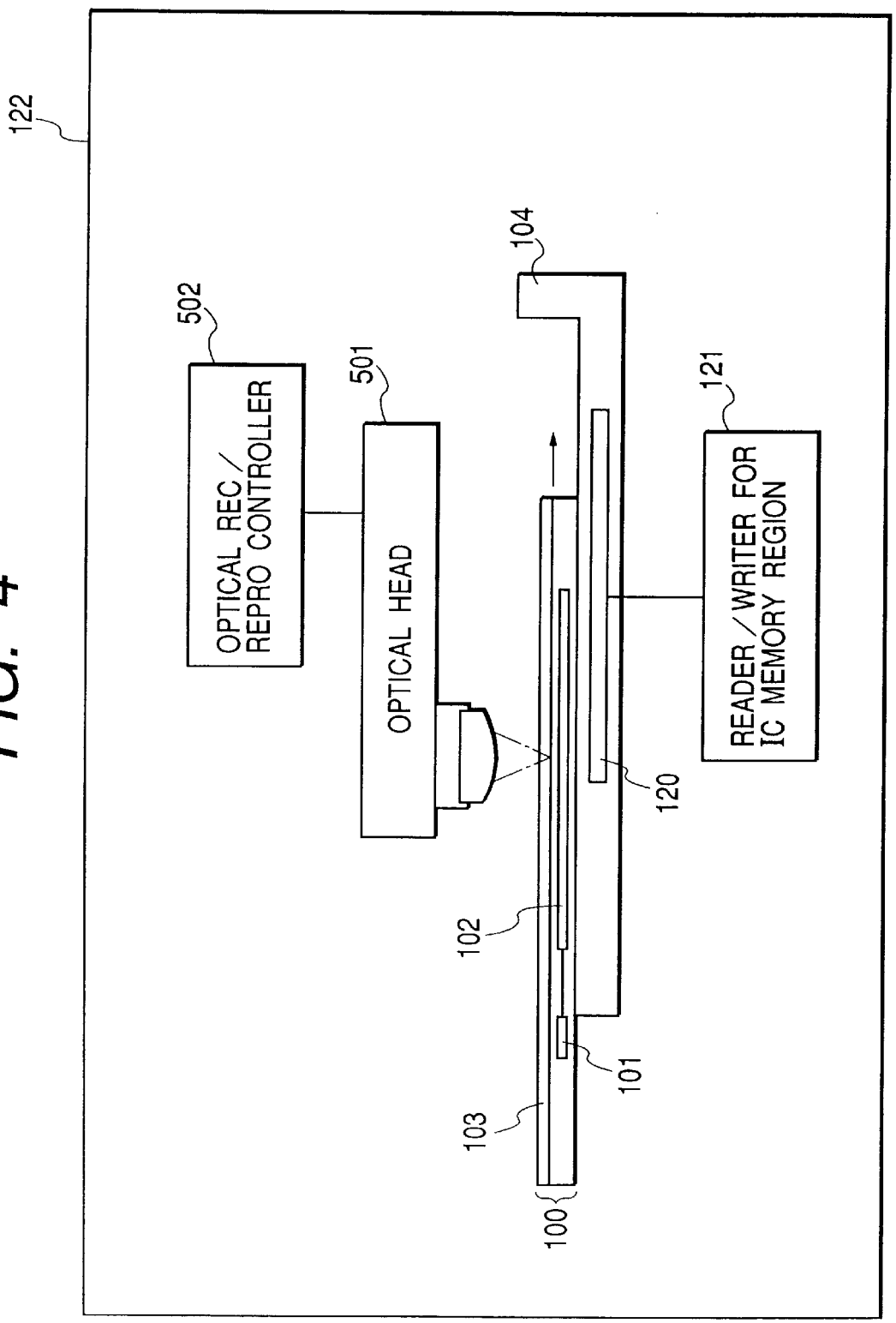
FIG. 4 is a schematic illustration of an apparatus for recording information on and reproducing information from a hybrid card according to the invention.

FIG. 4 is a schematic illustration of a hybrid reader/writer 122 for recording information on and reproducing information from a hybrid card 100, or an information recording medium, having a configuration as described above and comprising an optical recording region 103, an IC memory region 101 and an antenna coil 102 as illustrated in FIGS. 1A and 1B. How information is recorded in and reproduced from the IC memory region 101 is already described above. Referring now to FIG. 4, reference numeral 104 denotes a card carrying table (hereinafter referred to as card holder) for receiving a hybrid card 100 and holding it in position. An antenna coil 120 is arranged in the card holder 104 and connected to the reader/writer 121 for the IC memory region. Reference numeral 501 denotes an optical head unit and reference numeral 502 denotes an optical recording/reproduction controller.

The hybrid card 100 is placed on the card holder 104 with its front surface facing the card holder 104 so that the antenna coil 102 in the hybrid card 100 is located vis-a-vis the antenna coil 120 of the card holder 104, whereas the optical recording region 103 of the hybrid card 100 is located vis-a-vis the optical head unit 501. The hybrid card is brought to its proper position along the arrow in FIG. 4 until it abuts the card holder 104. The antenna coil 102 in the hybrid card 100 and the antenna coil 120 in the card holder 104 are closely coupled with each other and hence information can be recorded in or reproduced from the IC memory region according to a recording command or a reproducing command (whichever appropriate) from the reader/writer 121 for the IC memory region at any time under this condition.

Similarly, information can be recorded in or reproduced from the optical recording region 103 by way of the optical head unit 501 according to a recording command or a reproducing command (whichever appropriate) from the optical recording/reproduction controller 502 at any time under this condition. How information is recorded in and reproduced from the optical recording region 103 is already described above. A remarkable feature of such a reader/writer 122 is that it is provided with independent reader/writer units to be used respectively for the optical recording region 103 and the IC memory region 101 of a hybrid card so that both the optical information and the electronic information are accessible simultaneously.

With such a hybrid card that utilizes electromagnetic induction to exchange information and supply power in a manner as described above, the electromagnetic induction used for recording information in and reproducing information from the IC memory region can affect the AT/AF control operation for driving the objective lens by means of a coil and a magnet arranged in an actuator.

According to the invention, an apparatus and a system for at least recording information on or reproducing information from a recording medium according to the invention incorporates either of the improvements listed below in order to minimize the influence of electromagnetic induction.

(1) No information is stored in nor read from the IC memory region of the recording medium while at least a tracking control operation or a focusing control operation is under way.

(2) The optical head unit is so controlled as to at least record information in or reproduce information from the optical recording region of the recording medium except the area where it is overlapped by the antenna coils.

A detailed description of the first improvement will follow.

Figure 5:
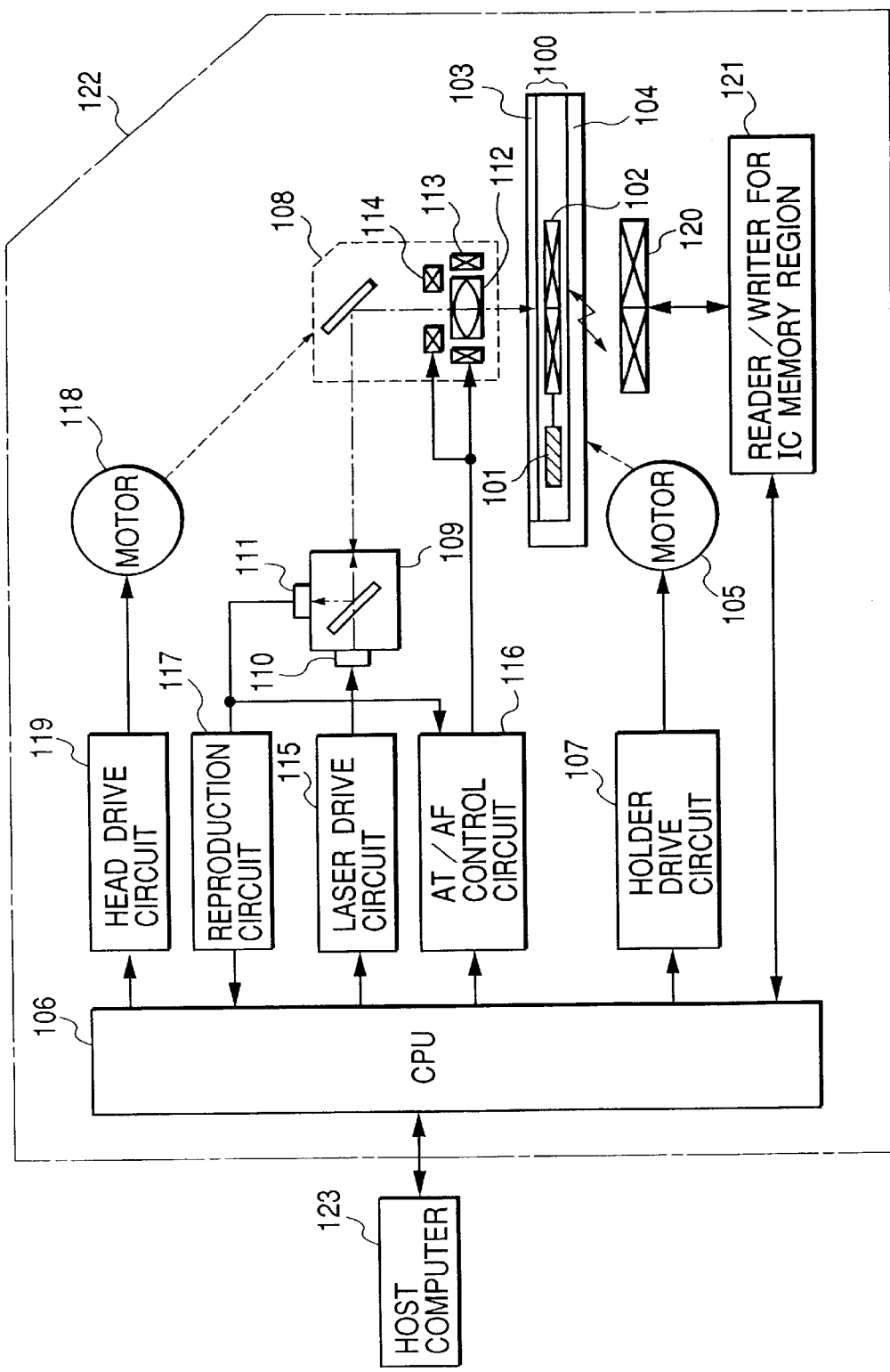
FIG. 5 is a schematic block diagram of an embodiment of apparatus for recording and reproducing information according to the invention.

FIG. 5 is a schematic block diagram of an embodiment of hybrid reader/writer according to the invention. The components in FIG. 5 that are same as those of the apparatus of FIG. 4 are denoted respectively by the same reference symbols. Assume that a hybrid card 100 having a configuration described above by referring to FIGS. 1A, 1B and 3 is used. In FIG. 5, the hybrid reader/writer 122 is connected to an external host computer 123. The CPU 106 in the hybrid reader/writer 122 exchanges data with the host computer 123 and controls the operation of each of the components according to the command from the host computer 123.

As described above by referring to FIGS. 1A and 1B, the hybrid card 100 comprises on the front surface thereof an IC memory region 101 including a CPU, a memory and a power source and an antenna coil 102 and on the rear surface thereof an optical recording region 103. Once the hybrid card 100 is put into a card insertion slot (not shown) of the hybrid reader/writer 122, the card 100 is moved to the card holder 104 by means of a transfer mechanism (not shown) and held in place on the card holder 104 in such a way that the antenna coil 102 on the front surface of the card is located vis-a-vis the antenna coil 120 arranged below the card holder 104.

The card holder 104 is driven by a motor 105 to move in a direction perpendicular to the tracks of the optical recording region 103 of the hybrid card 100 and allow the light spot to access the target track of the optical recording region 103 on the hybrid card 100. The motor 105 is, in turn, driven by a holder drive circuit 107 according to a command from the CPU 106. An optical head unit is located above the hybrid card 100 to irradiate the optical recording region 103 of the hybrid card 100 with a beam of light for recording/reproducing information.

The optical head unit comprises a movable head 108 and a fixed head 109. The fixed head 109 contains therein a semiconductor laser 110 operating as a light source and a photodetector 111 detecting light reflected from the hybrid card 100. The photodetector 111 comprises light receiving devices adapted for information reproduction, focusing control and tracking control, respectively as will be described hereinafter. On the other hand, the movable head 108 contains therein an objective lens 112 for focusing the beam of light from the semiconductor laser 110 to a fine spot and irradiating the hybrid card 110 with the beam, an AT coil (the coil of the tracking actuator) 113 for driving the objective lens 112 in the tracking direction and an AF coil (the coil of the focusing actuator) 114 for driving the objective lens in the focusing direction.

The semiconductor laser 110 in the fixed head 109 is driven by a laser drive circuit 115 to emit a laser beam according to the command from the CPU and the intensity of the laser beam is modulated in a predetermined mode of modulation to record information. When reproducing information, the intensity of the laser beam from the semiconductor laser 110 is controlled to a level too low to record any information. The detection signal produced by the photodetector 111 in the fixed head 109 is sent to AT/AF control circuit 116, which is adapted to control the AT coil 113 and the AF coil 114 according to the detection signal to regulate the objective lens 112 in the tracking direction and the focusing direction for the purpose of tracking control, and focusing control respectively. Reproduction circuit 117 performs a photoelectric conversion on the detection signal from the photodetector 111 and amplifies the converted signal before it outputs a corresponding reproduction signal. Then, the CPU 106 carries out a predetermined signal, processing operation on the reproduction signal including demodulation of the signal in order to generate reproduction data.

The movable head 108 is driven by motor 118 to reciprocatingly move along the tracks of the optical recording region 103. As a result of this reciprocating motion, the light spot and the hybrid card 100 reciprocatingly move relative to each other along the tracks so that the light spot may scan the information tracks. The motor 118 is controlled by head drive circuit 119 according to the command from the CPU 106. On the other hand, the antenna coil 120 is arranged below the card holder 104 at a position vis-a-vis the antenna coil 102 of the hybrid card 100 and connected to the reader/writer 121 for the IC memory region. The reader/writer 121 for the IC memory region drives the antenna coil 120 under the control of the CPU 106 to communicate with the hybrid card 100 by way of the antenna coil 102 of the latter in order to record information in and reproduce information from the IC memory region 101.

Figure 6:
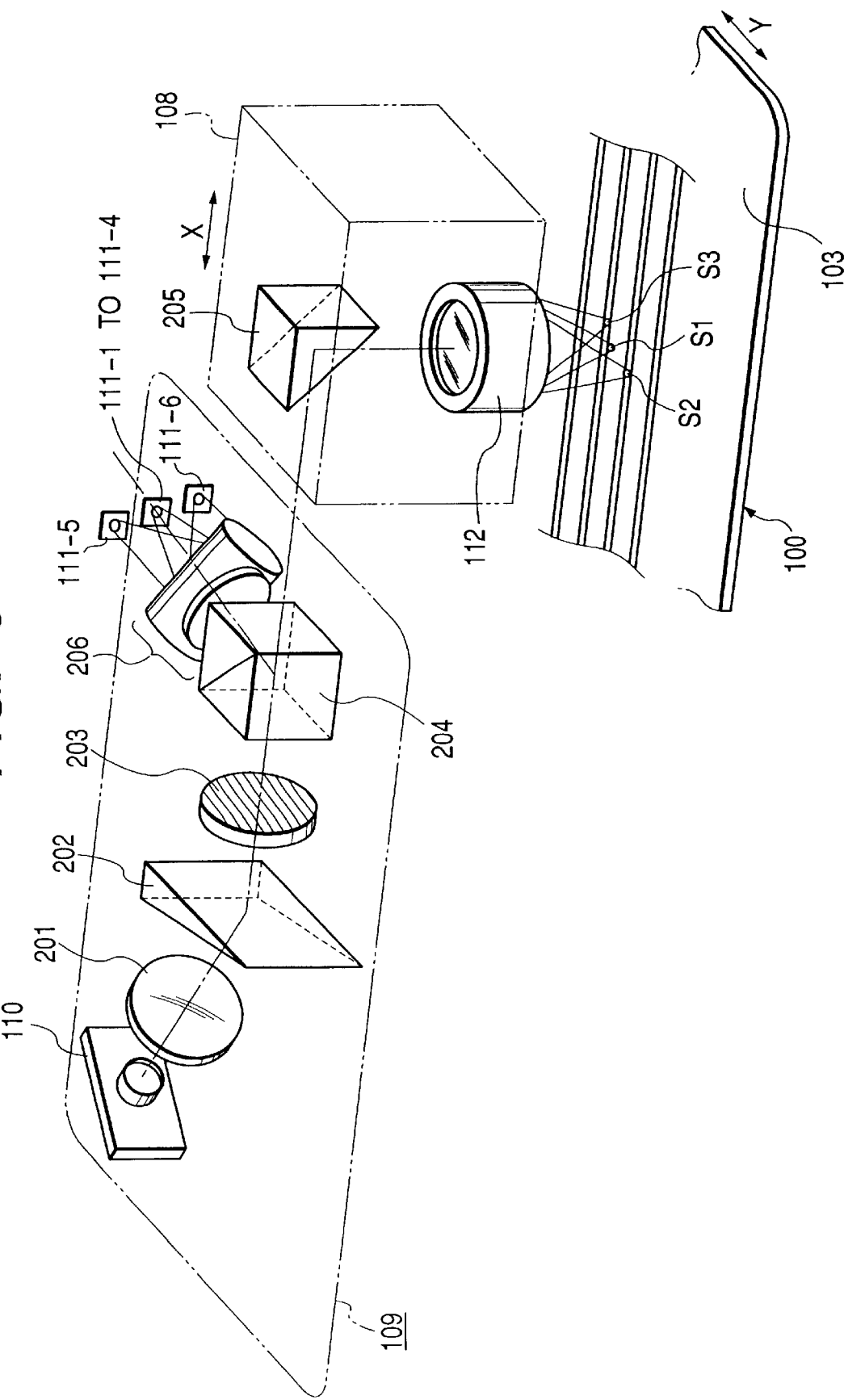
FIG. 6 is an exploded schematic perspective view of the optical head unit of the apparatus of FIG. 5.

FIG. 6 is an exploded schematic perspective view of the optical head unit of the apparatus of FIG. 5 comprising the movable head 108 and the fixed head 109. Referring to FIG. 6, a semiconductor laser 110 operating as a light source for recording and reproducing information is arranged in the fixed head 109. The laser beam that is emitted from the semiconductor laser 110 and diverging is collimated by collimator lens 201 and shaped to show a predetermined intensity distribution pattern by a beam-shaping prism 202. The beam of light that exits the beam-shaping prism 202 is then divided into three beams including a beam of zero-order diffracted light and two beams of first-order (±1) diffracted light by means of a diffraction grating 203. The divided beams of light are then made to pass through a polarization beam splitter 204 and reflected by a reflection prism 205 located in the movable head 108 before being led to the objective lens 112. The three beams of light are then converged by the objective lens 112 and focused to produce fine spots S1, S2 and S3 on the hybrid card 100. In FIG. 6, S1, S2 and S3 respectively denote the light spot of zero-order diffracted light, the light spot of first-order (±1) diffracted light and the light spot of first-order (−1) diffracted light.

Figure 7:
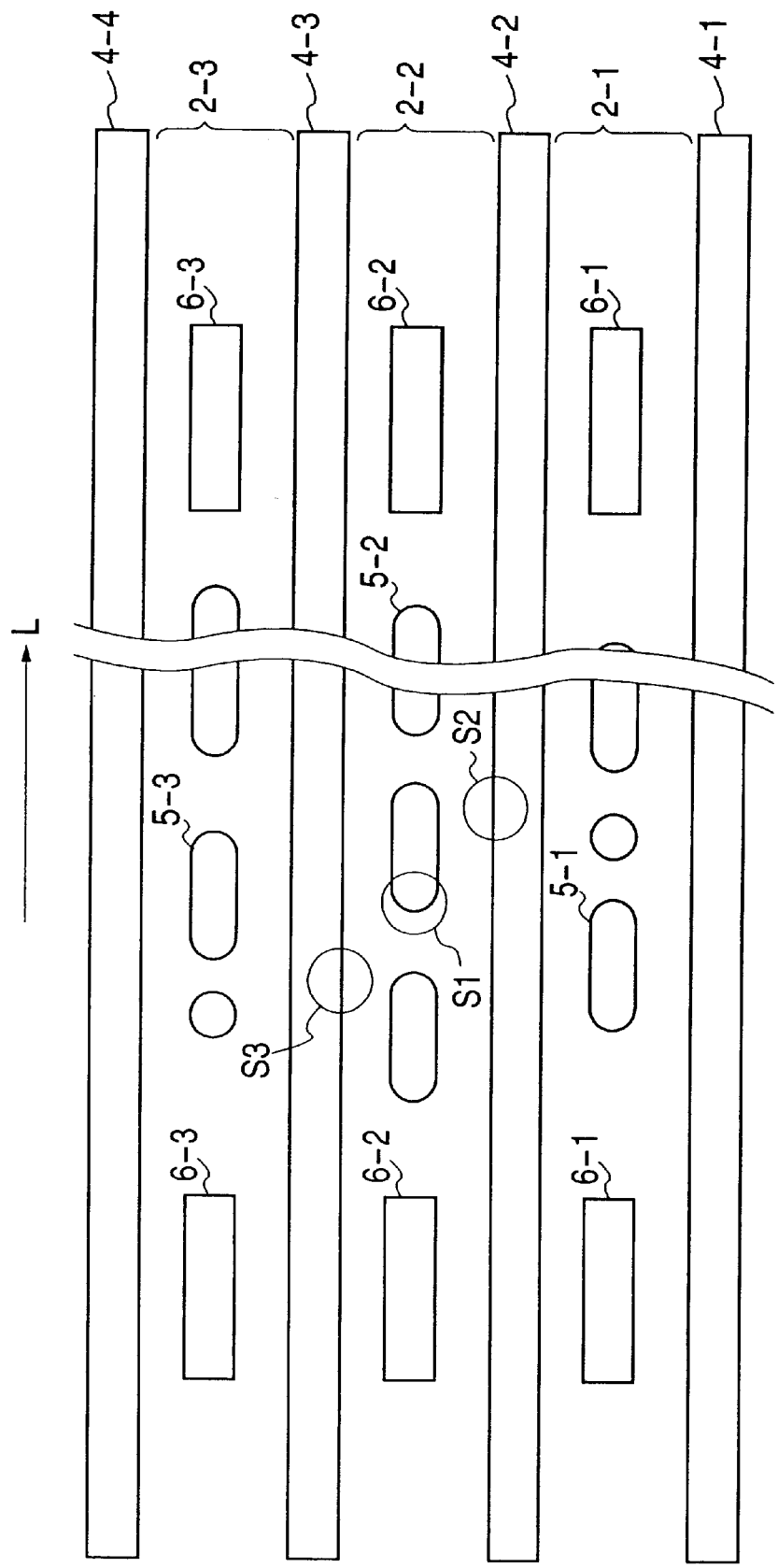
FIG. 7 is an enlarged schematic partial view of the optical recording surface of a hybrid card.

FIG. 7 is an enlarged schematic partial view of the optical recording region 103, showing the light spots S1, S2 and S3.

Referring to FIG. 7, the light spots S2 and S3 located on the tracking tracks 4-2, 4-3 partly and respectively are those of the plus/minus first-order diffracted light produced by the diffraction grating 203. The light spots S2 and S3 are used for AT control. On the other hand, the light spot S1 is that of the zero-order diffracted light and is located at about the center of the information track 2-2 between the tracking tracks 4-2 and 4-3 and is used for AF control and for recording information in and reproducing information from the information pit it strikes. In FIG. 7, reference symbols 5-1 through 5-3 denote rows of information pits and reference symbols 6-1 through 6-3 denote track numbers (addresses) of the tracks arranged along the respective rows 5-1 through 5-3 of information pits. The information tracks are provided with respective track numbers to be used to identify them.

Returning to FIG. 6, the three light spots striking the optical recording region 103 of the hybrid card 100 are reflected by the surface of the optical recording region 103 and are then made to pass through the objective lens 112 in order to bring them into a collimated state once again. Then, the collimated light is led back to the polarization beam splitter 204 by way of the reflection prism 205 and then converged by converging lens system 206 before entered to the photodetector 111. The photodetector 111 comprises light receiving devices 111-5, 111-6 and quadrisectional light receiving devices 111-1 through 111-4 arranged therebetween. The output signal of the light receiving device 111-5 and that of the light receiving device 111-6 are used for the purpose of tracking control, whereas those of the light receiving devices 111-1 through 111-4 are used for focusing control and for the reproduction of information. The output signals of the light receiving devices of the photodetector 111 are output to the AT/AF control circuit 116.

Figure 8:
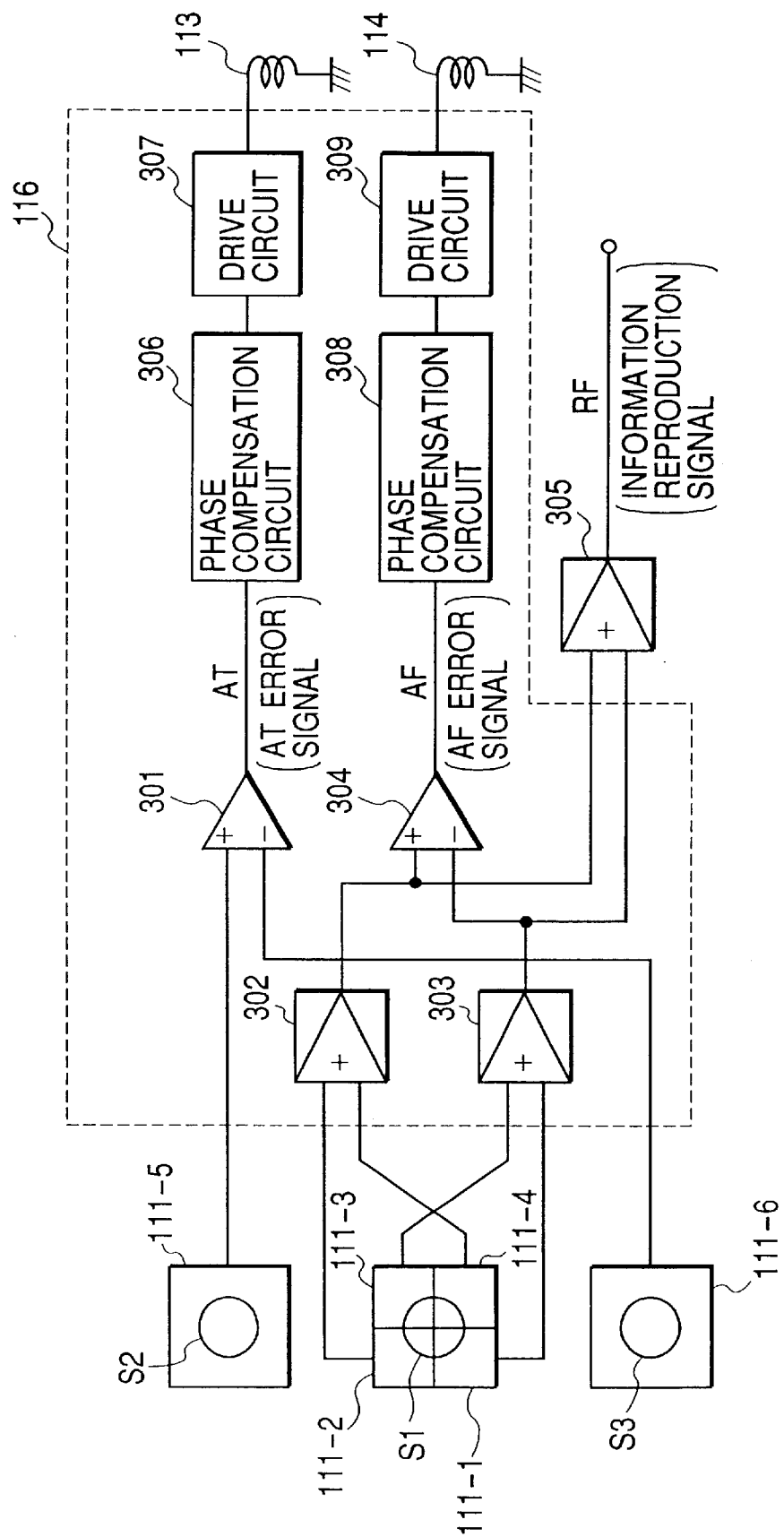
FIG. 8 is a schematic block diagram of the tracking control and focusing control circuit of the apparatus of FIG. 5.

FIG. 8 is a schematic block diagram of the photodetector 111 and the AT/AF control circuit 116 of the hybrid reader/writer 122, illustrating them in greater detail. Referring to FIG. 8, reference numeral 111 denotes the photodetector described above by referring to FIGS. 5 and 6 and comprising the light receiving devices 111-5, 111-6 and the quadrisectional light receiving devices 111-1 through 111-4. The light spots S1, S2 and S2 on the light receiving devices in FIG. 8 show those produced by light reflected from the hybrid card 100. The light spots S1, S2 and S3 correspond to the light spots S1, S2 and S3 in FIG. 7 respectively. The light spots S2 and S3 to be used for AT control are received by the light receiving devices 111-5 and 111-6, whereas the light spot S1 to be used for AF control and for recording/reproducing information is received by the quadrisectional light receiving devices 111-1 through 111-4.

The output signal of the light receiving device 111-5 and that of the light receiving device 111-6 are sent to a subtraction circuit 301 and an AT error signal will be generated if any difference is detected by the subtraction circuit 301 between the two signals. The output signals of the diagonally located quadrisectional light receiving devices 111-2 and 111-4 are added by an addition circuit 302, while the output signals of the other diagonally located quadrisectional light receiving devices 111-1 and 111-3 are added by another addition circuit 303. The difference, if any, between the output signal of the addition circuit 302 and that of the addition circuit 303 is detected by another subtraction circuit 304, which outputs an AF error signal for the detected difference. The output of the addition circuit 302 and that of the addition circuit 303 are added by another addition circuit 305 to obtain a sum signal for the quadrisectional light receiving devices, which is then output as an information reproduction signal RF.

The AT error signal is output to a phase compensation circuit 306 for phase compensation and is then fed to a drive circuit 307. The drive circuit 307 drives the AT coil 113 for AT control. On the other hand, the AF error signal is output to another phase compensation circuit 308 for phase compensation and then is fed to another drive circuit 309. The drive circuit 309 drives the AF coil 114 for AF control. While not shown in FIG. 8, both the drive circuit 307 and the drive circuit 309 are adapted to directly drive the AF coil 114 and the AT coil 113, respectively, according to the command from the CPU 106. Operations such as AF pull-in, AT pull-in and kick are realized as a result of driving the coils.

As described above, the light spots S2 and S3 are made to partly strike respective tracking tracks of the optical recording region 103, whereas the light spot S1 is made to strike the information track located between the two tracking tracks as shown in the enlarged view of FIG. 7. The tracking tracks have a reflectivity smaller than that of the information tracks so that if either one of the light spots S2 and S3 is displaced from the corresponding track, the detection signals of the light receiving devices 111-5 and 111-6 detecting the beams returning from the light spots S2 and S3 show a disparity. Thus, any difference between the detection signal of the light receiving device 111-5 and that of the light receiving device 111-6 gives rise to a tracking error signal representing the amount and the orientation of the displacement of the light spot in question relative to the corresponding track. Then, the AT coil 113 shown in FIG. 5 is controlled according to the tracking error signal and the objective lens is finely regulated for its position along the tracking direction (Y-direction) in order to control the tracking operation in such a way that the light spot S1 for information recording/reproduction may not deviate from the information track it is scanning.

Figure 9:
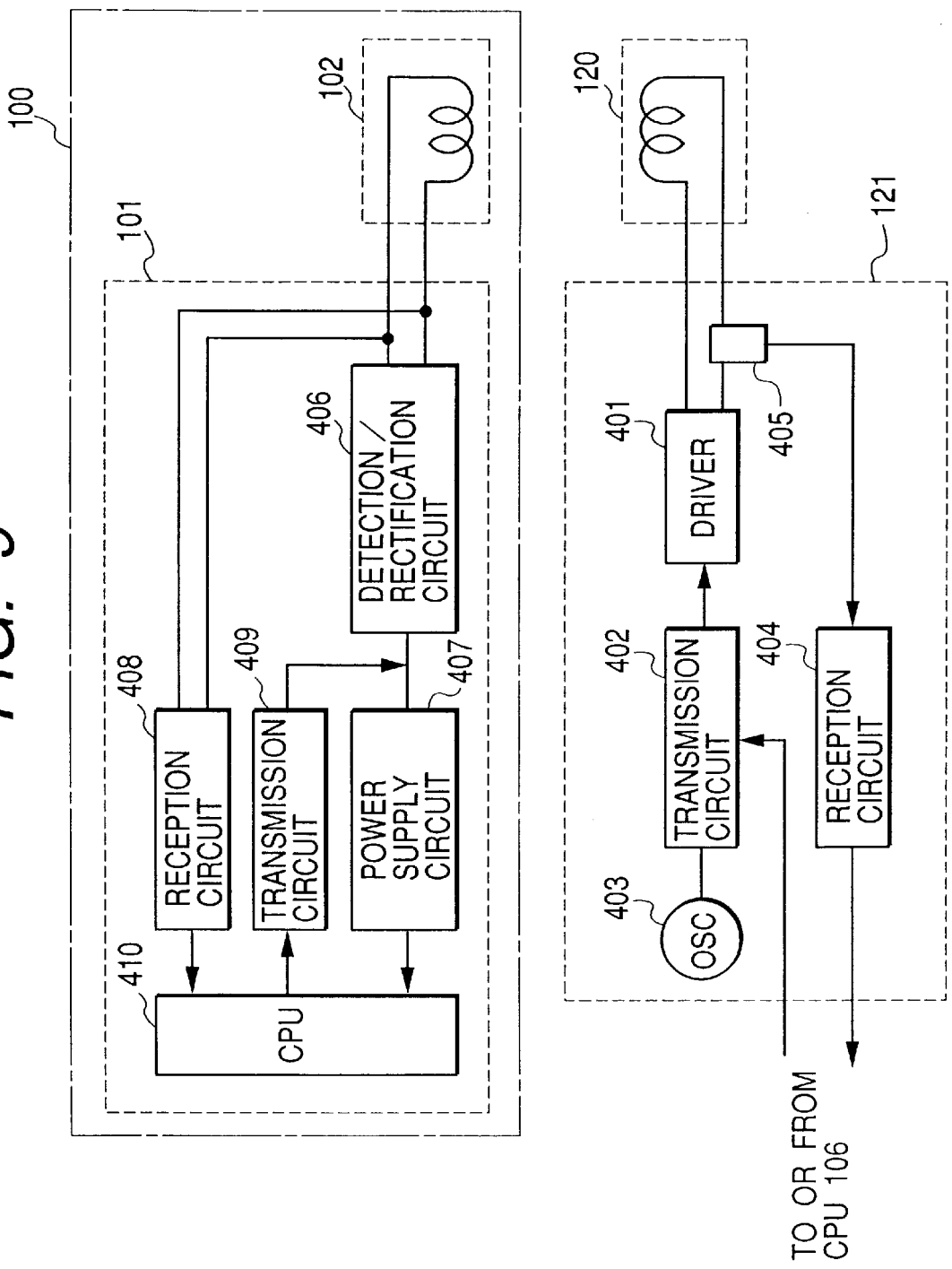
FIG. 9 is a schematic block diagram of the reader/writer of the apparatus of FIG. 5.

FIG. 9 shows in greater detail the IC memory region 101 and the antenna coil 102 of the hybrid card 100 and the reader/writer adapted to communicate with the hybrid card 100 in a non-contact fashion. Referring to FIG. 9, the hybrid card 100 comprises the IC memory region 101 and the antenna coil 102 as described earlier. The IC memory region 101 has a CPU 410 for controlling the operation of each of its components, a reception circuit 408 for receiving the signal from the antenna coil 102, a transmission circuit 409 for transmitting the signal from the CPU 410 and a power supply circuit 407 for supplying power to each of the components of the card 100 and a detection/rectification circuit 406 for rectifying the signal from the antenna coil 102. More specifically, the detection/rectification circuit 406 rectifies the modulated high frequency signal transmitted from the hybrid reader/writer 122 by way of the antenna coils 120 and 102 and the power supply circuit 407 supplies each of the components of the IC memory region 101 with the rectified DC voltage as power having a predetermined voltage.

On the other hand, the hybrid reader/writer 122 comprises the antenna coil 120 electromagnetically coupled with the antenna coil 102 of the hybrid card 100 and the reader/writer 121 for the IC memory region connected to it. The reader/writer 121 for the IC memory region has an oscillation circuit (OSC) 403 adapted to generate a high frequency signal having a predetermined frequency, a transmission circuit 402 for modulating the high frequency signal from the oscillation circuit 403 by the data from the CPU 106 and output it as a modulated high frequency signal, a driver 401 for driving the antenna coil 120 according to the output signal of the transmission circuit 402, a current detector 405 for detecting the high frequency current from the antenna coil 120 and a reception circuit 404 for demodulating the detected high frequency current.

Figure 10:
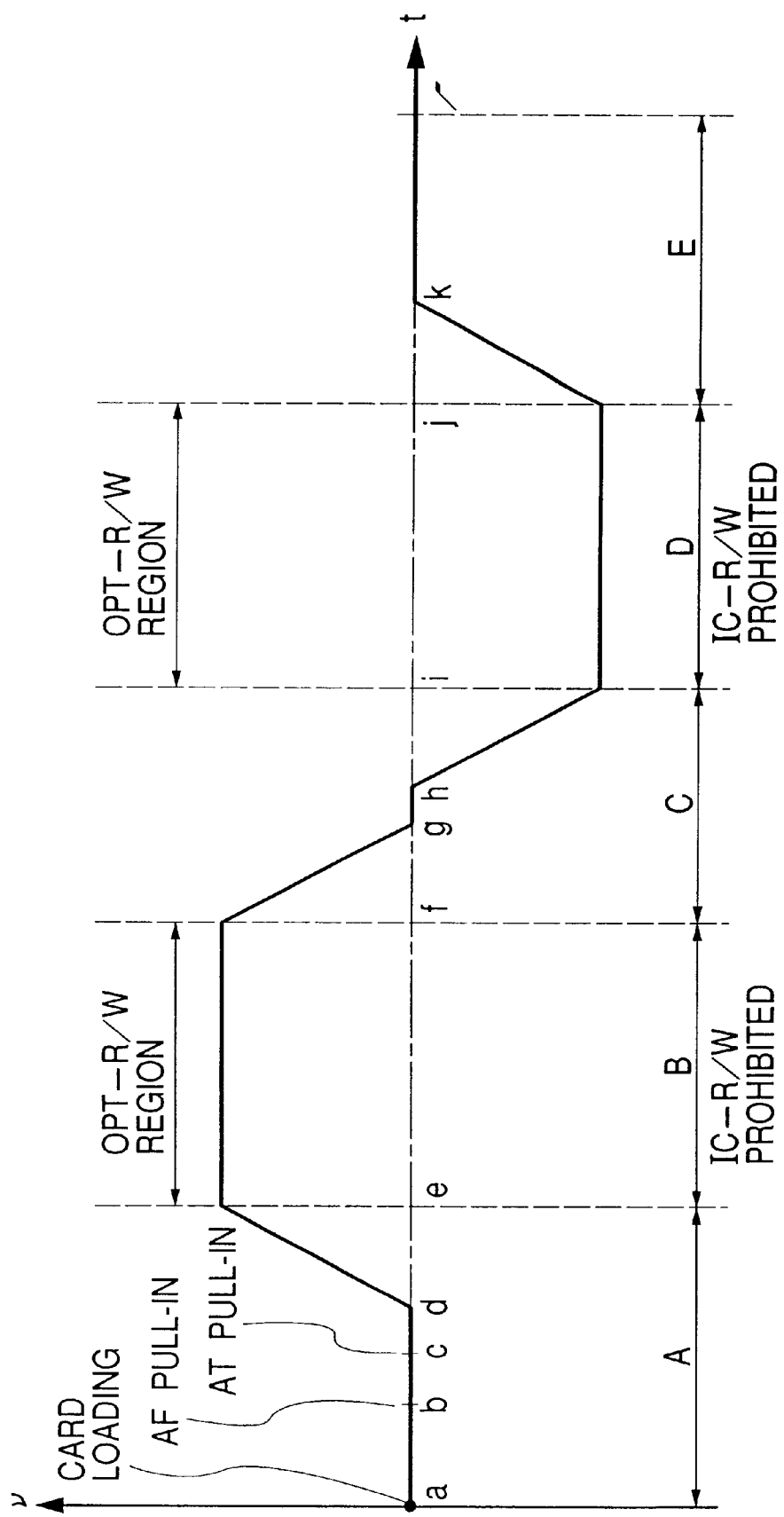
FIG. 10 is a timing chart that can be used for the operation of the apparatus of FIG. 5.

Now, the process of recording (or reproducing) information after the hybrid card 100 is put into the hybrid reader/writer 122 will be described by referring to FIG. 10. Note that, in FIG. 10, the horizontal axis is the time axis for indicating the timing of AT/AF pull-in, the acceleration/deceleration span and the recording/reproduction span. The vertical axis in FIG. 10 represents the scanning speed of the light spot relative to the hybrid card 100. Normally, the constant-speed scanning area located at the center of the optical recording region 103 of the hybrid card is used to record/reproduce information by means of the light spot of the optical head.

Once the hybrid card 100 is put into the card insertion slot of the hybrid reader/writer 122, the card 100 is moved to the card holder 104 by means of a transfer mechanism (not shown) and held in place on the card holder 104 (point a). At this time, the movable head 108 is located just at the home position 3 in FIG. 3. With this embodiment, information is recorded in or reproduced from the IC memory region 101 of the hybrid card 100 in span A from the time when the card 100 is inserted into the slot to the time when the relative speed of the light spot and the card gets to a constant value (point e).

Since the information stored in the IC memory region is hardly accessible to a third party, the use of a card comprising an IC is advantageous in terms of security. Normally, important information including is personal information is stored in the IC memory region, which is then used to identify the user so that only the right user may be allowed to operate the hybrid reader/writer. Therefore, with this embodiment, information is recorded in and/or reproduced from the IC memory region 101 before the optical recording region 103 is used for information recording/reproduction to the advantage of the user. More specifically, the ID information stored in the IC memory region 101 is used firstly to identify the user of the card so that the embodiment refuses to be driven thereafter if the user is found to be a fraudulent user.

Now, the operation of recording information in and reproducing information from the IC memory region 101 at a span from point a to point e will be described in greater detail by referring to FIG. 10. When transmitting (recording) data from the hybrid reader/writer 122 to the hybrid card 100, the data from the host computer 123 is processed by the CPU 106 of the hybrid reader/writer 122 and then sent to the transmission circuit 402. The transmission circuit 402 is fed with a high frequency signal as a carrier having a constant amplitude and coming from the oscillation circuit 403 and the carrier is modulated by the data from the CPU 106 to output a modulated high frequency signal. Any mode of modulation, such as frequency modulation or phase modulation, adapted to a constant amplitude, may feasibly be used for the purpose of the invention. The modulated high frequency signal output from the transmission circuit 402 is fed to the antenna coil 120 by way of the driver 401.

Since the hybrid card 100 is already held in position in the hybrid reader/writer 122 by this time, the antenna coil 120 of the hybrid reader/writer 122 and the antenna coil 102 of the hybrid card 100 are electromagnetically coupled with each other. Thus, the modulated high frequency signal transmitted from the antenna coil 120 of the hybrid reader/writer 122 is fed to the IC memory region 101 of the hybrid card 100 by way of the antenna coil 102. The modulated high frequency signal is then rectified by the detection/rectification circuit 406 and fed to each of the components of the hybrid card 100 as power with a predetermined voltage by way of the power supply circuit 407. On the other hand, the output signal of the antenna coil 102 is also fed to the reception circuit 408, which demodulates the data and sends it to the CPU 410. The CPU 410 processes the data it receives and writes it into a memory (not shown) to complete the operation of recording information in the IC memory region 101.

For transmitting (reproducing) data from the hybrid card 100 to the hybrid reader/writer 122, an unmodulated high frequency signal having a constant amplitude is output from the transmission circuit 402 of the reader/writer 121 for the IC memory region. The high frequency signal is sent to the hybrid card 100 by way of the driver 401, the antenna coil 120 and the antenna coil 102. The high frequency signal is rectified by the detection/rectification circuit 406 of the hybrid card 100 and fed to each of the components of the hybrid card 100 as power with a predetermined voltage by way of the power supply circuit 407.

Meanwhile, the data is read from the memory (not shown) of the hybrid card 100 and the CPU 410 processes the data and sends it to the transmission circuit 409. The transmission circuit 409 typically comprises a load resistor and a switch, which is turned on and off by bit "1" and bit "0" of the data respectively. As the switch of the transmission circuit 409 is turned on and off, the load to the antenna coil 120 is changed to change the amplitude of the high frequency current flowing to the antenna coil 120. Thus, the amplitude of the high frequency current is modulated by the data fed from the CPU 410 of the hybrid card 100 to the transmission circuit 409. Then, the high frequency current is detected by the current detection means 405 and demodulated by the reception circuit 404 to produce the data, which is then processed by the CPU 106 and sent to the host computer 123.

While information is being recorded in or reproduced from the IC memory region 101 in span A in FIG. 10, the CPU 106 controls the laser drive circuit 115 and activates the semiconductor laser 110 for the power level of information reproduction at point b in FIG. 10. Additionally, the CPU 106 controls the drive circuit 309 of FIG. 8 and drives the AF coil 114 to move the objective lens 112 in the AF direction. At this time, the movable head 108 is located at the home position of the optical recording region 103 and performs an AF pull-in operation by means of light of the light spot S1 reflected by the home position 3. As the AF pull-in operation is completed, the AF servo is activated.

When the AF pull-in operation is over, the CPU 106 controls the holder drive circuit 107 so as to drive the motor 105 and move the card holder 104 that carries thereon the hybrid card 100 transversally relative to the tracks until the light spot gets to the target track. Then, at point c, the CPU 106 controls the drive circuit 307 of FIG. 8 so as to drive the AT coil 113 and move the objective lens 112 in the AT direction in a reciprocating fashion. Under this condition, the AT servo is activated as the AT error signal is made equal to 0 by using reflected light of each of the light spots S2 and S3. Thus, both the AF servo and the AT servo are activated to make the embodiment ready for recording information in or reproducing information from the optical recording region 103.

When the AT pull-in operation is over, the CPU 106 controls the head drive circuit 119 so as to drive the motor 118 and accelerate the movement of the movable head 108 in a direction along the tracks from point d. As the movable head 108 gets to a predetermined constant speed at point e, the head drive circuit 119 moves the movable head 108 at the constant speed to record information on or reproduce information from the target track in the optical recording region 103 for span B, which is a constant speed scanning span. If the target track is not located, the light spot is moved to locate the target track once again by means of a kick motion or a seek motion.

A "kick" as used herein refers to a motion transverse to the direction of the tracks that is realized by directly driving the AT coil 113 by means of the drive circuit 307 according to the command from the CPU 106. When the track where the scanning light spot is currently positioned is away from the target track, the AT servo is temporarily deactivated and the motor 105 is caused to drive the card holder 104 to the target track. Once the scanning light spot gets to the target track, AT is pulled-in and the movable head 108 is driven to move along the track to read the track number in order to ensure that the track is the right target track. If the track is identified to be the right target track, the operation of recording/reproducing information will be started. If, on the other hand, it is found that the track is not the right target track, the scanning light spot is kicked to the right target track for information recording/reproduction. Note that, with this embodiment, any operation of recording information in and that of reproducing information from the IC memory region 101 are prohibited during the operation of recording information in or reproducing information from the optical recording region 103 in the span B.

As information is recorded in or reproduced from the track in the span B and the movable head 108 is moved from point d to point f to scan the track by a predetermined distance, the CPU 106 controls the head drive circuit 119 so as to decelerate the motion of the movable head 108. As a result, the movable head 108 reduces its speed until speed 0 is reached at point g, where the movable head 108 comes to a complete halt to finish the operation of scanning a single track. For recording information in or reproducing information from the optical recording region 103 in the opposite direction, the scanning light spot is moved to an adjacent track by kicking it between point g and point h and then the motion of the movable head 108 is accelerated from point h in the opposite direction. Once the speed of the movable head 108 gets to a predetermined constant level at point i, information will be recorded/reproduced during constant-speed scanning span D. Note that any operation of recording information in and that of reproducing information from the IC memory region 101 are also prohibited during the operation of recording information in or reproducing information from the optical recording region 103 in the span D. As information is recorded in or reproduced from the track in the span D and the movable head 108 is moved from point h to point j to scan the track by a predetermined distance, the motion of the movable head 108 is decelerated to reduce the speed of the movable head 108 until speed 0 is reached at point k, where the movable head 108 comes to a halt to complete a single stroke of the movable head 108.

Thus, with this embodiment, any operation of recording information in and that of reproducing information from the IC memory region 101 is prohibited during the operation of recording information in or reproducing information from the optical recording region 103 in order to minimize the influence of electromagnetic induction exerted by the antenna coils 102 and 120 during telecommunication on the operation of the AF servo and that of the AT servo for recording information in or reproducing information from the optical recording region 103 so that both the AT servo and the AF servo can be operated highly accurately.

Additionally, because of the minimized influence of electromagnetic induction, the positional arrangement of the actuator for AF servo and AT servo has no restrictions to down-size the hybrid reader/writer. Still additionally, a strong magnetic field can be used for telecommunications between the hybrid card and the reader/writer to increase the service area of the reader/writer.

Also, the antenna coil 102 of the hybrid card 100 can be down-sized to reduce the dimensions and the weight of the hybrid card 100 and make it easy to be carried because of the fact that a strong magnetic field can be used for telecommunications between the hybrid card and the reader/writer. Still additionally, the procedure of operation of the hybrid card is so arranged that information is recorded in or reproduced from the IC memory region 101 first and then the AF servo and the AT servo are activated before recording information in or reproducing information from the optical recording region 103 so that the user can be identified firstly by the ID data stored in the IC memory region 101 to the advantage of the reader/writer.

While any operation of recording information in and that of reproducing information from the IC memory region 101 is prohibited during the operation of recording information in or reproducing information from the optical recording region 103 in span B and span D with this embodiment, information is recorded in or reproduced from the IC memory region 101 in span A before recording information in or reproducing information from the optical recording region 103 as described above. If necessary, the operation of recording information in or reproducing information from the IC memory region 101 can be conducted in span C and/or in span E, which are acceleration/deceleration spans, in addition to span A. It should be noted here that the tolerance for error with regard to the AT/AF servo is different between the span of using the AT and AF coils from point b and the span for recording information in or reproducing information from the optical recording region 103 such as span B and/or span D (where both the AT coil and the AF coil are naturally in operation). The error tolerance for the span for recording information in or reproducing information from the optical recording region 103 should be rigorously limited in order to successfully carry out the information recording/reproducing operation. If large AT/AF errors occur, the scanning light spot can be deviated so that the recording operation would not be conducted at the right position and the reproducing operation would not produce right reproduction signals. Thus, any operation of recording information in and that of reproducing information from the IC memory region 101 are prohibited during the operation of recording information in or reproducing information from the optical recording region 103 with this embodiment because the span for recording information in or reproducing information from the optical recording region 103 can be significantly affected by the electromagnetic induction generated for recording information in or reproducing information from the IC memory region 101.

Figure 11:
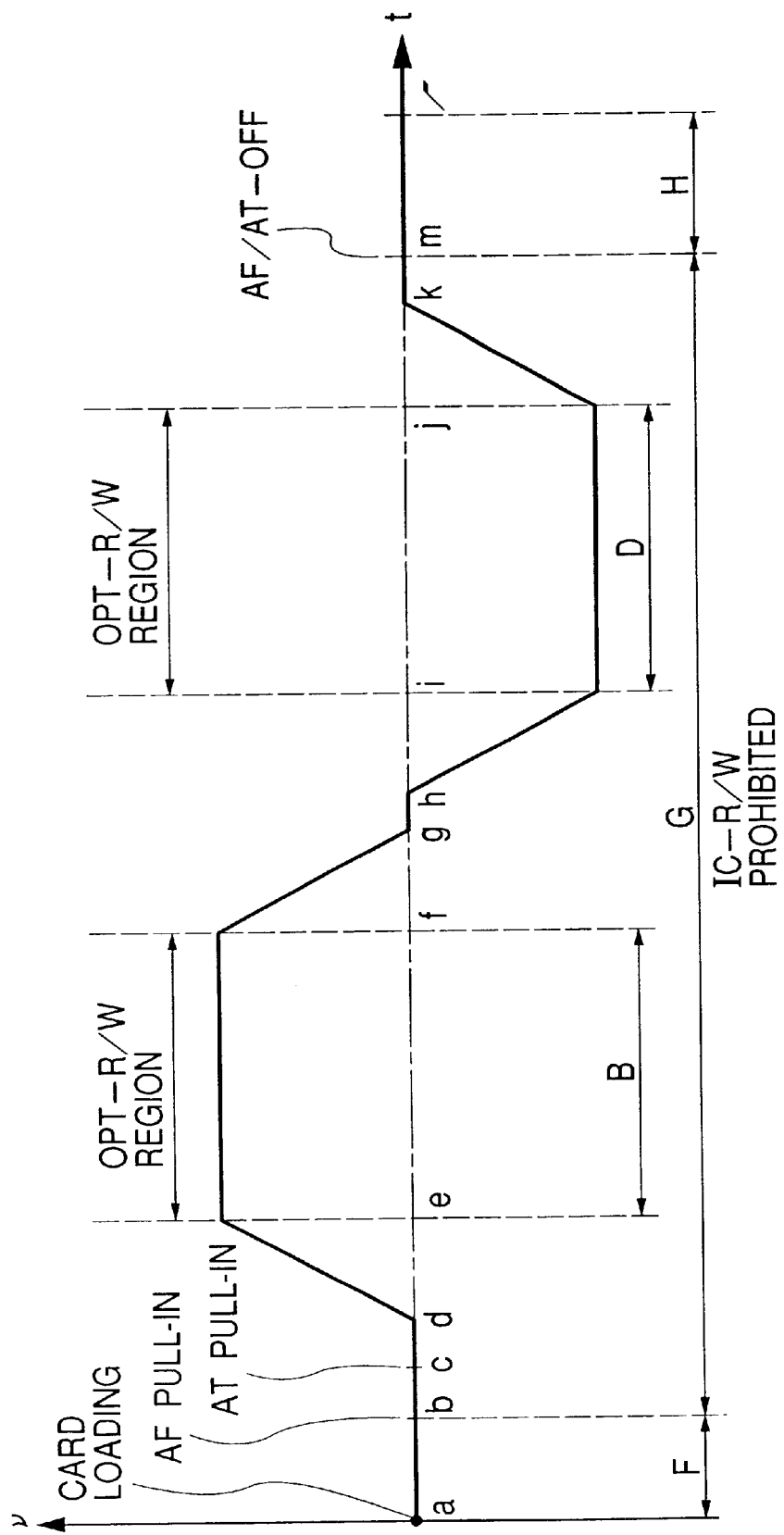
FIG. 11 is another timing chart that can be used for the operation of the apparatus of FIG. 5.
Figure 12:
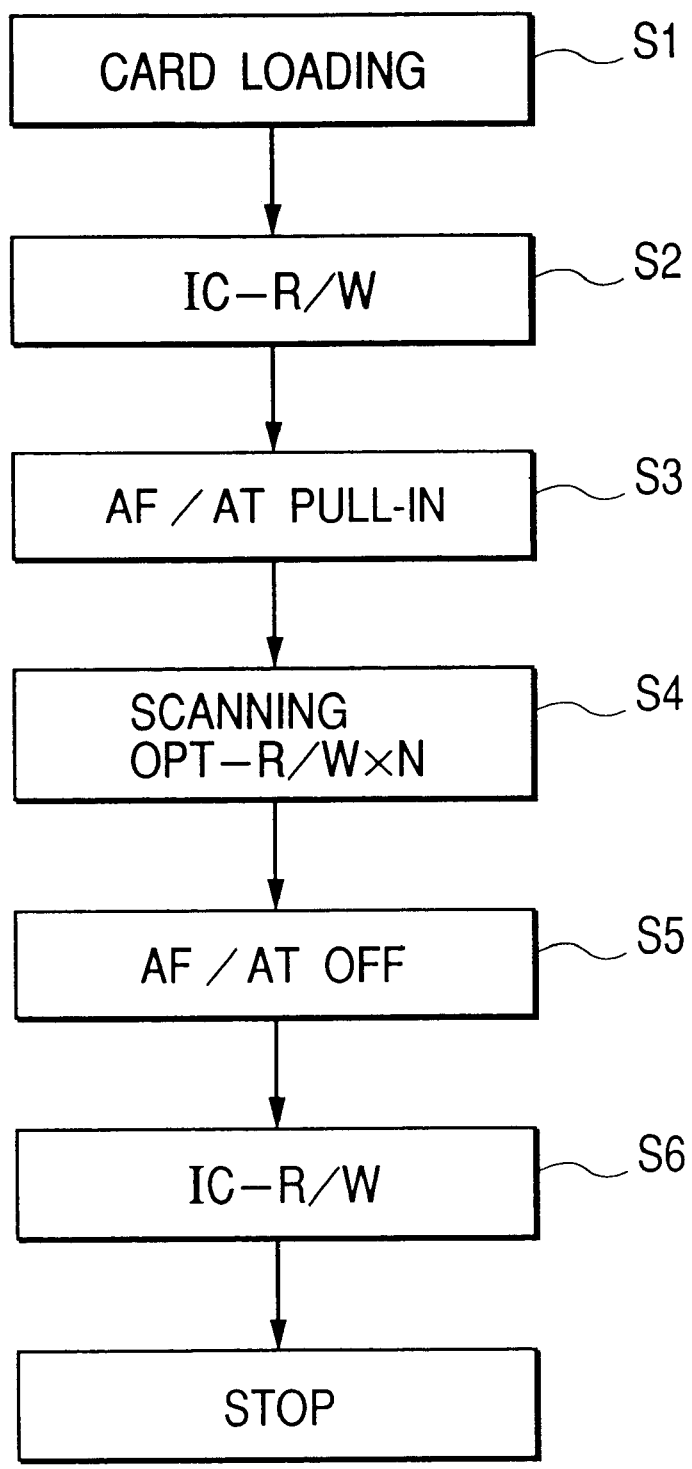
FIG. 12 is a flow chart that can be used with the timing chart of FIG. 11 for the operation of the apparatus of FIG. 5.

Now, a second embodiment of the invention will be described by FIGS. 11 and 12. The configuration of this embodiment is same as that of FIG. 5 and a hybrid card 100 as described above by referring to FIGS. 1A, 1B and 3 will also be used with this embodiment. FIG. 11 is a timing chart that can be used for the operation of the second embodiment. As in the case of FIG. 10, the horizontal axis is the time axis whereas the vertical axis represents the scanning speed of the light spot relative to the hybrid card. FIG. 12 is a flow chart that can be used for this embodiment with the timing chart of FIG. 11.

Once the hybrid card 100 is put into the card insertion slot of the hybrid reader/writer 122, the CPU 106 controls the components of the embodiment so that the card 100 is moved to the right position on the card holder 104 at point a in FIG. 11 (S1 in FIG. 12). At this time, the movable head 108 is located just at the home position 3 in FIG. 3.

As the card 100 is placed in position, the CPU 106 controls the components of the embodiment and information is recorded in or reproduced from the IC memory region 101 of the hybrid card 100 in span F to point b (S2). Subsequently, the semiconductor laser 110 is activated for the power level of information reproduction to perform an AF pull-in operation at point b and then an AT pull-in operation is performed at point c (S3). As the AF and AT pull-in operations are completed, information is recorded in or reproduced from the optical recording region 103 (S4). More specifically, the movable head 108 is accelerated from point d and the operation of recording information in or reproducing information from the optical recording region 103 is carried out in span B from point e to point f, which is a constant speed scanning span. The movable head 108 is then decelerated from point f until it comes to a complete halt at point g.

Then, the scanning light spot is kicked to an adjacent track between point g and point h and the movable head 108 is accelerated from point h in the opposite direction. Once the speed of the movable head 108 gets to a predetermined constant level at point i, information will be recorded/reproduced during constant speed scanning span D. When the constant speed scanning span is over, the movable head 108 is decelerated at point j until the speed gets to 0 at point k, when it comes to a complete halt. The AT servo and the AF servo are deactivated at point m (S5) and information is recorded in or reproduced from the IC memory region 101 in span H between point m to point l (S6) to finish the operation of recording information in or reproducing information from the hybrid card 100.

Note that, with this embodiment, any operation of recording information in and that of reproducing information from the IC memory region 101 is prohibited during the operation of recording information in or reproducing information from the optical recording region 103 in the span G between point b and point m. More specifically, any operation of recording information in and that of reproducing information from the IC memory region 101 is prohibited during the period of using the AT coil 113 and the AF coil 114 between the time of an AF pull-in operation and the time when both the AF servo and the AF servo are deactivated so that the operation of recording information in or reproducing information from the IC memory region 101 is conducted in span F and also, if necessary, in span H. The AT coil 113 and the AF coil 114 are used for AF/AT pull-in operations, for a kick and for the AT servo and the AF servo during the span G between point b and point m. The AF/AT pull-in operations, the kick and the AT servo and the AF servo may not be conducted properly if they are affected by the electromagnetic induction generated by telecommunication between the antenna coil 102 and the antenna coil 120. However, with this embodiment, any operation of recording information in and that of reproducing information from the IC memory region 101 are prohibited so long as the AF coil 113 and the AT coil 114 are in operation so that AF/AT pull-in operations and a kick motion can be conducted more reliably with this embodiment than with the first embodiment to realize accurate AF servo and AT servo.

While the movable head 108 is driven along the tracks of the optical recording region 103 in the above description, the card holder 104 may alternatively be driven along the tracks. Additionally, while the two antenna coils are brought close to each other to realize a non-contact, close-coupled type apparatus in the above embodiments, the present invention may be embodied as a proximity, vicinity or remote-type apparatus where two antenna coils are separated from each other by a relatively long distance. Still additionally, while the hybrid card is automatically introduced into the apparatus by a transfer mechanism in the above embodiments, the hybrid card may be loaded and unloaded manually. Finally, while power is fed to the hybrid card by way of the coils, the card may alternatively be made to contain a battery.

Now, the above pointed out second improvement that the optical head is so controlled as to at least record information in or reproduce information from the optical recording region of the recording medium except the area where it is overlapped by the antenna coils will be described.

Figure 13A:
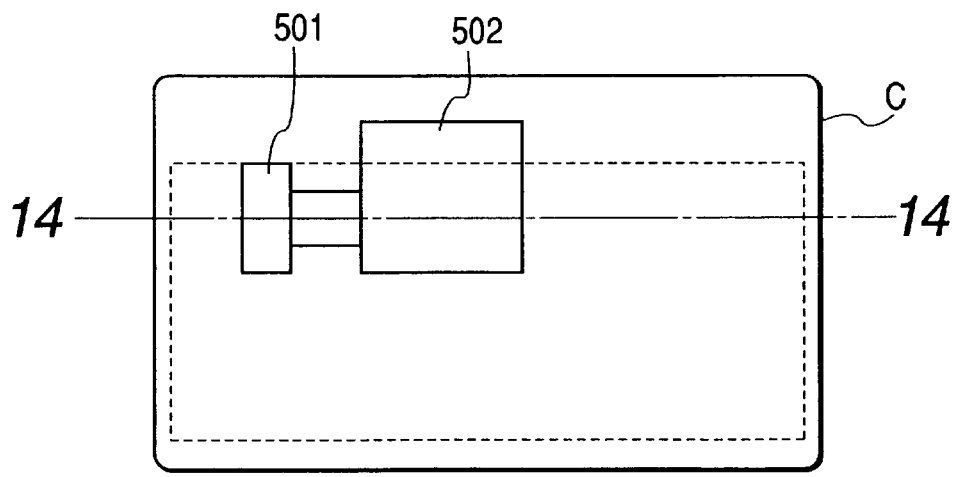
FIGS. 13A and 13B are schematic plan views of another hybrid card that can be used with an apparatus and a system according to the invention.
Figure 13B:
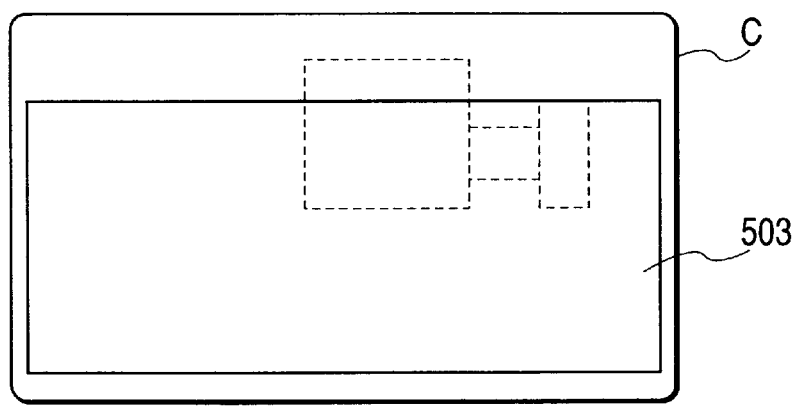

FIGS. 13A and 13B are schematic plan views of another hybrid card that can be used with this mode of carrying out the invention. FIG. 13A shows the IC chip side (rear side) and FIG. 13B shows the optical recording region side (front side). The optical recording region is indicated by dotted lines in FIG. 13A, while the IC chip region is indicated by dotted lines in FIG. 13B.

Referring to FIGS. 13A and 13B, reference symbol C denotes a hybrid card and reference numeral 501 denotes an IC chip containing an CPU, whereas reference numeral 502 denotes an antenna coil region, which is connected to the IC chip 501. The IC chip 501 and the antenna coil region 502 are arranged as laminate so that they may be kept in shape and bound together. Reference numeral 503 denotes an optical recording region.

Figure 14:
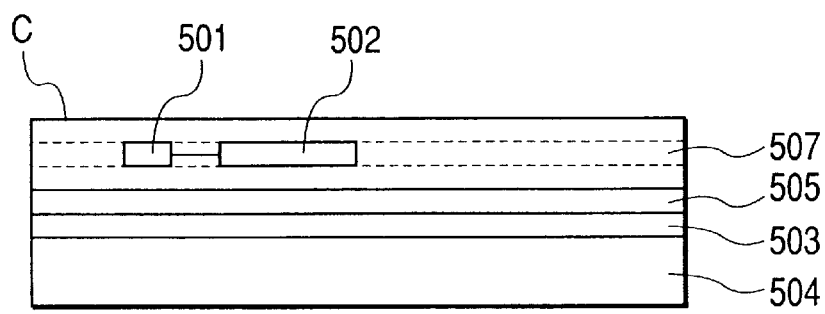
FIG. 14 is a schematic cross sectional view of the hybrid card taken along line 14—14 in FIG. 13A.

FIG. 14 is a schematic cross sectional view of the card of FIG. 13A taken along line 14—14. Note that the card is disproportionally expanded vertically in FIG. 14 for the ease of understanding. In FIG. 14, reference numeral 504 denotes a transparent substrate, reference numeral 505 denotes an adhesive layer, whereas reference numeral 507 denotes an IC substrate carrying therein the IC chip 501 and the antenna coil 502 arranged as laminate. As seen from FIGS. 13A, 13B and 14, the IC chip 501 and the antenna coil 502 are not located on the level of the optical recording region 503 and the IC chip 501, the antenna coil region 502 and the optical recording region 503 are partly overlapped by each other.

The optical recording region of the hybrid card C has a configuration as described earlier by referring to FIG. 3 and information is recorded in and reproduced from it under AT and AF control in a manner as described.

Figure 15:
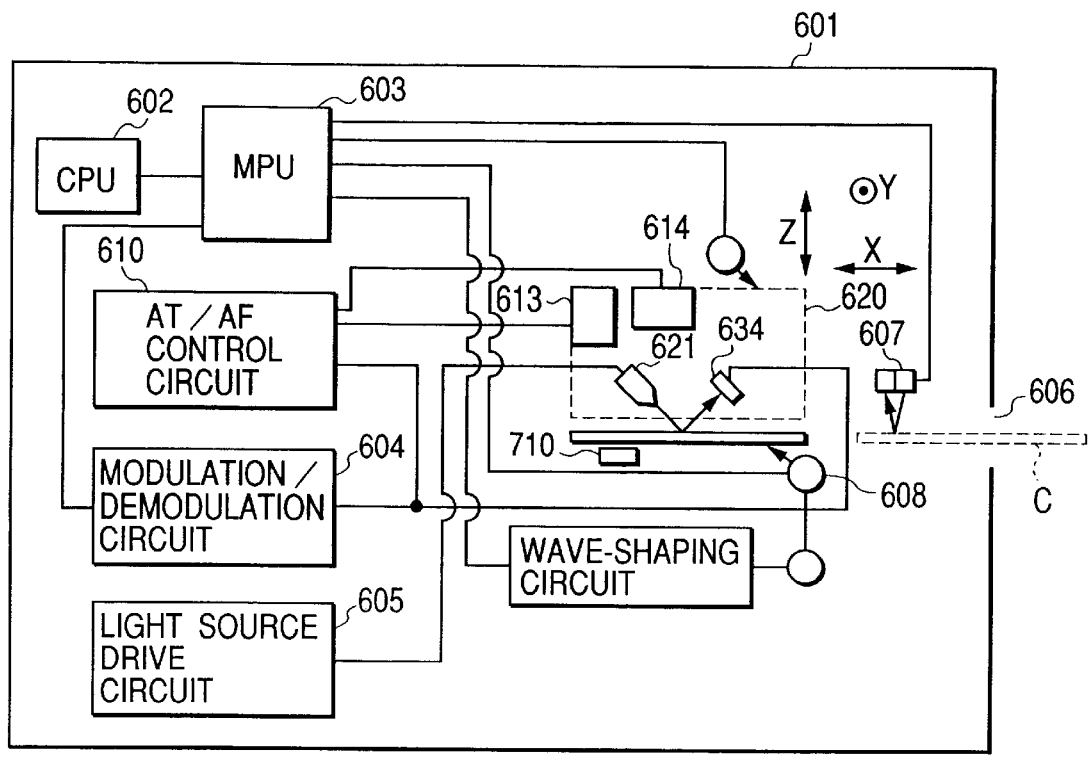
FIG. 15 is a schematic block diagram of another embodiment of apparatus for recording and reproducing information according to the invention.

FIG. 15 is a schematic block diagram of a known apparatus for recording information on and reproducing information from a hybrid card. In FIG. 15, reference numeral 601 denotes the apparatus for recording information on and reproducing information from a hybrid card (hereinafter referred to as drive) and reference numeral 602 denotes a CPU, which is a host control unit. The drive records or reproduces information according to the command issued from the CPU 602. Now, the configuration of drive 601 will be described. Referring to FIG. 15, reference numeral 608 denotes a motor for introducing a hybrid card C into or ejecting the hybrid card C from the drive 601 by means of a transfer mechanism (not shown). A sensor 607 is arranged near the card insertion slot 606 so that, when the sensor 607 detects an inserted hybrid card C, the hybrid card C is moved to a predetermined position in the drive 601 as described earlier. Then, the non-contact IC head 710 fitted to the drive 601 is placed vis-a-vis and closely coupled with the antenna coil 502 connected to the IC chip 501 of the hybrid card C so that information may be recorded in or reproduced from the non-contact IC chip.

Reference numeral 621 denotes an irradiation optical system including a light source. For recording/reproducing information, the flux of light from the irradiation optical system is led onto the optical recording region to produce a light spot, which light spot is moved reciprocatingly relative to the card C so that the information tracks are scanned by the light spot. Reference numeral 634 denotes a photodetector 634 for receiving light reflected from the optical recording region being irradiated by a spot of light. Thus, the recorded information is reproduced according to the detection signal of the photodetector 634. Reference numeral 613 denotes an AF actuator for driving part of the irradiation optical system 621 and moving the light spot in the Z-direction, which is perpendicular to the surface of the card, for AF control and reference numeral 614 denotes an AT actuator for driving also part of the irradiation optical system 621 and moving the light spot in the X-direction, which is perpendicular to both the Y-direction and the Z-direction, for AT control. Thus, the optical head 620 of this embodiment comprises the irradiation optical system 621, the photodetector 634, the AF actuator 613 and the AT actuator 614. Reference numeral 603 denotes an MPU containing a built-in ROM and a built-in RAM and is used to control the components of the apparatus including a card feeding motor 608 and the operation of exchanging data with the CPU 602 under the control of the latter. Reference numeral 610 denotes an AT/AF control circuit for driving the AF actuator 613 and the AT actuator 614 according to the detection signal of the photodetector for AT control and AF control. Reference numeral 604 denotes a modulation/demodulation circuit for reproducing the detection signal of the photodetector 634 and demodulating the reproduced signal to consequently reproduce the recorded data. Reference numeral 605 denotes a light source drive circuit for modulating and controlling the intensity of light of the light source (not shown) according to the output of the modulation/demodulation circuit 604 to consequently record information on the information recording tracks of the optical recording region of the hybrid card C by means of optical modulation.

Now, the configuration and the operation of the AT actuator and those of the AF actuator will be described.

Figure 16:
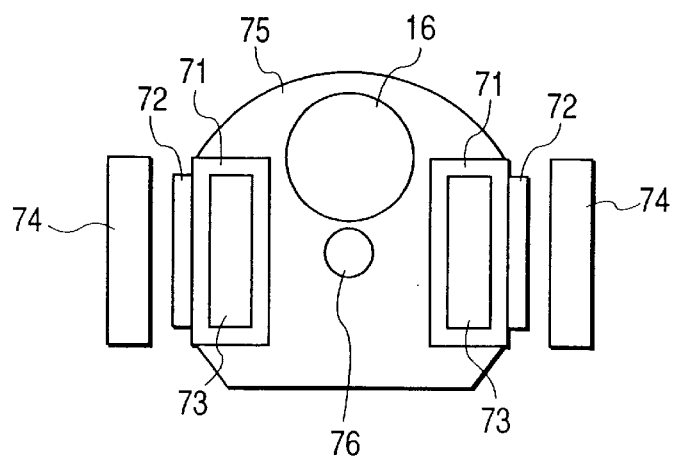
FIG. 16 is a schematic illustration of the optical pickup of the apparatus of FIG. 15.

FIG. 16 is a schematic illustration of the optical pickup of the apparatus of FIG. 15 comprising an AT actuator and an AF actuator. Referring to FIG. 16, there are shown AF coils 71, AT coils 72, magnets 73 for AF, magnets 74 for AT, a base 75 and a slide shaft 76. The objective lens 16 of the optical system, the AF coils 71 and the At coils 72 are fitted to the base 75. When an electric current is applied to the AF coils 71 according to an AF error, the base 75 is moved in a direction perpendicular to the surface of FIG. 16 for an auto-focusing operation by the repelling force that arises between it and the magnets 73 for AF. When, on the other hand, an electric current is applied to only one of the AT coils 72 according to an AT error, the left one in FIG. 16 for example, the sliding shaft 76 is driven to rotate clockwise for an auto-tracking operation by the repelling force that arises between it and the left-side magnet 74 for AT.

Normally, when AT/AF control is in effect, an electric current is constantly flowing to the AF coils 71 and the AT coils 72 so that the base 75 does not contact any other components except the sliding shaft 76 so that the objective lens 16 is floating in air.

The operation of recording information in and that of reproducing information from the IC chip are conducted in a manner as described earlier by referring to FIG. 2.

In this mode of carrying out the invention, a hybrid card as described above by referring to FIGS. 13A through 14 and an apparatus as described above by referring to FIG. 15 are used.

Figure 17:
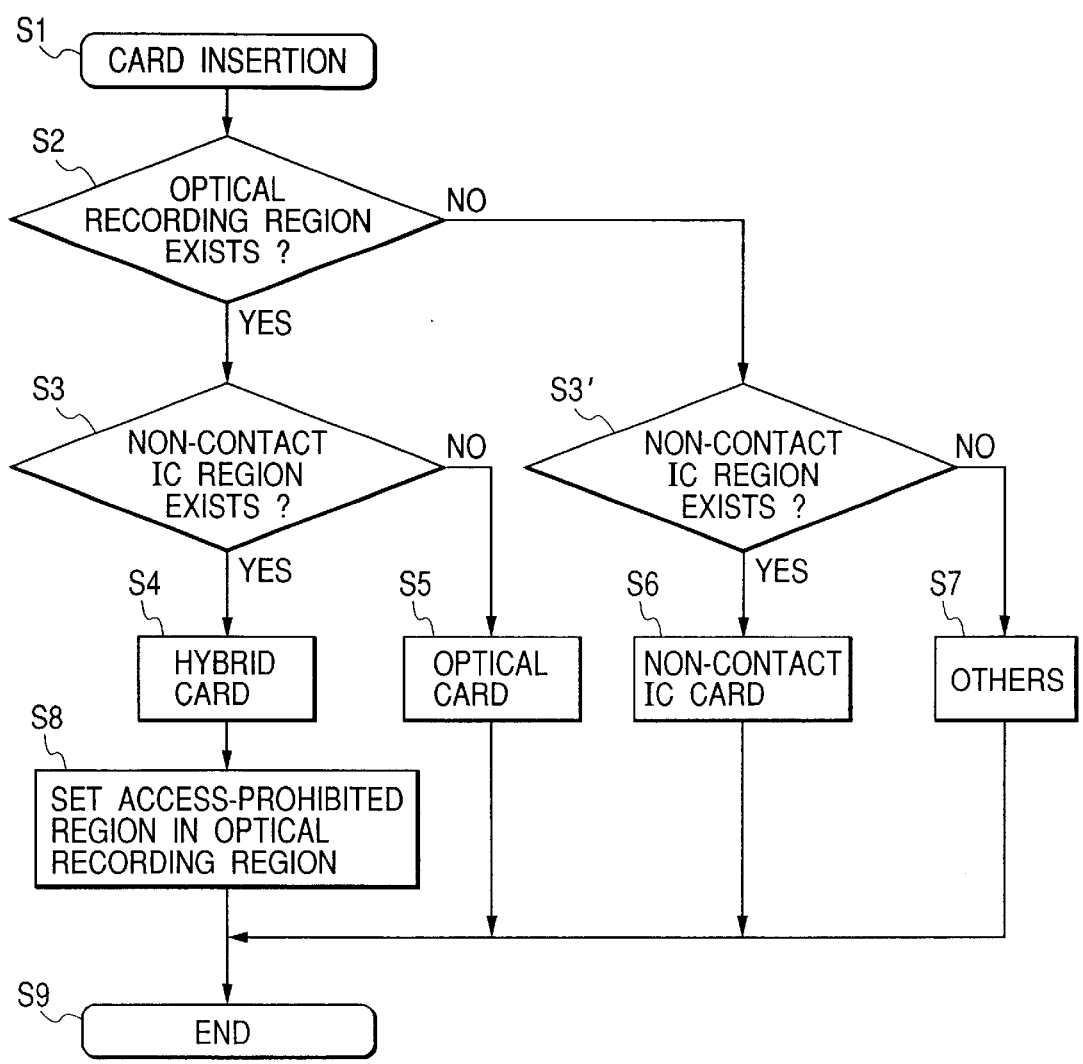
FIG. 17 is a flow chart that can be used for the operation of th apparatus of FIG. 15.

FIG. 17 is a flow chart that can be used for the operation of the apparatus when a card is inserted into it. Note that the processing operation of FIG. 17 and the operation of each of the components of the apparatus are controlled by the CPU and the MPU of the recording/reproducing apparatus.

Now, the operation of the embodiment for recording information in or reproducing information from a hybrid card that starts when the card is inserted into the apparatus will be described by referring to FIGS. 13A through 18.

Firstly referring to FIG. 15, as the hybrid card C is put into the insertion slot 606 of the drive 601 (S1), the MPU 603 controls the related components to transfer the hybrid card C to the right position in the apparatus and causes the light spot to strike the home position 3 in FIG. 3, where an AF pull-in operation is conducted. The presence or absence of an optical recording region in the card brought into the apparatus is determined by the CPU 602 on the basis if the AF pull-in operation is terminated normally or not (S2).

As the hybrid card C is moved to the right position in the apparatus, the non-contact IC head 710 is placed vis-a-vis and closely coupled with the antenna coil 502 connected to the IC chip 501 so that information may be recorded or reproduced from the non-contact IC chip.

Then, information is reproduced from or recorded in a memory area having a given address and the presence or absence of a non-contact IC region is determined by the CPU 602 on the basis if the reproducing or recording operation is terminated normally or not (S3 and S3').

As a result of the above sequence of operation, it is now determined if the card brought into the apparatus is a hybrid card as illustrated in FIGS. 13A and 13B or not.

Figure 18:
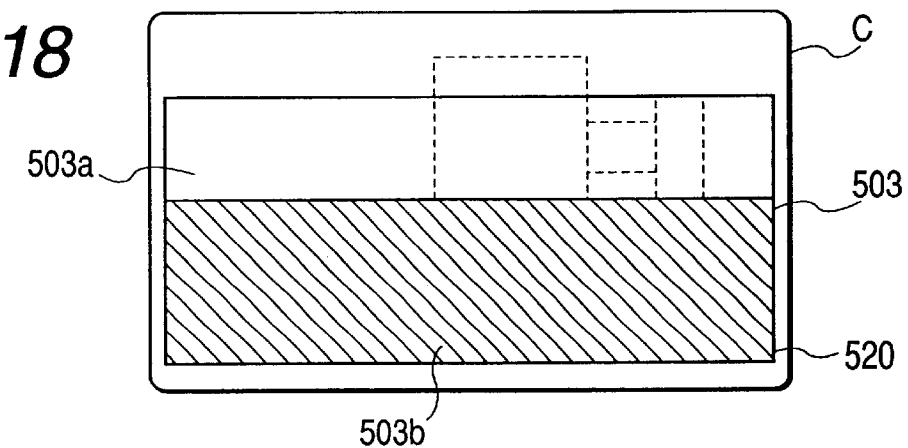
FIGS. 18, 19A, 19B and 20 are schematic plan views of other hybrid cards that can be used with an apparatus and a system according to the invention.

If it is determined that the card is a hybrid card (S4), the area 503a of the optical recording region 503 overlapped by the antenna coil 502 that is now stably located at the predetermined position of the hybrid card C as shown in FIG. 18 is specified as an access-prohibited area according to the data stored in the ROM of the MPU 3 (S8). The data stored in the ROM may include the number of available information recording tracks and the track number of the track that is not overlapped by the antenna coil and located nearest to the antenna coil.

Thus, if the card is found to be a hybrid card, only the shaded area 503b of the optical recording region 503 other than the area 503a overlapped by the antenna coil is used for recording information in or reproducing information from the optical recording region by means of the optical head.

Note that FIG. 18 shows the optical recording region side of the hybrid card, where an access-prohibited area and an access-permitted area are defined in the optical recording region as illustrated in FIG. 13B.

Thereafter, information is recorded in or reproduced from both the optical recording region and the non-contact IC region as in the case of any known apparatus adapted to use a hybrid card.

If, on the other hand, the card is found to be an optical card (S5), information is recorded in or reproduced from the optical recording region and the entire optical recording region may be used as in the case of any known apparatus adapted to use an optical card.

If, finally, the card is found to be an non-contact IC card (S6), information is recorded in or reproduced from the non-contact IC region as in the case of any known apparatus adapted to use a non-contact IC card.

Thus, as the above embodiment of the invention comprises a means for determining the type of the card inserted into it, it can record information on and reproduce information from an uni-functional card, such as an optical card or a non-contact IC card, in addition to a hybrid card.

If an optical card comprising only an optical recording region is inserted into the apparatus, the entire optical recording region can be used for recording information to fully exploit the memory capacity of the optical card.

While the type of the card put into the apparatus is determined by detecting the presence of absence of a optical recording region and/or a non-contact IC region in this embodiment, the type may alternatively be determined by means of the information preformatted in the optical recording region and/or the information recorded in the IC chip region. In any case, the type of the card can be determined efficiently and quickly by accessing the single recording medium put into the apparatus.

Additionally, while an access-prohibited area is defined in the optical recording region of the hybrid card put into the apparatus according to the data stored in the MPU of the apparatus in advance in this embodiment, the data preformatted in the optical recording region of the card or the information recorded in the IC chip may alternatively be used to define an access-prohibited area in the optical recording region. In any case, an access-prohibited area can be defined in the optical recording region without determining the type of the card so that the operation of recording information on or reproducing information from the card can be started quickly. Additionally, the embodiment can accommodate hybrid cards having antenna coils and optical recording regions with different profiles to obtain information concerning the accessible area of the optical recording region from the card so that the memory capacity of the optical recording region can always be effectively exploited.

Now, an information recording/reproducing system according to the invention and adapted to define an effective optical recording region in a hybrid card on the basis of the data written once in the recording region of the hybrid card after the preparation of the card, for example when the card is issued to the user, and record information in or reproduce information from the defined effective optical recording region will be described.

Figure 19A:
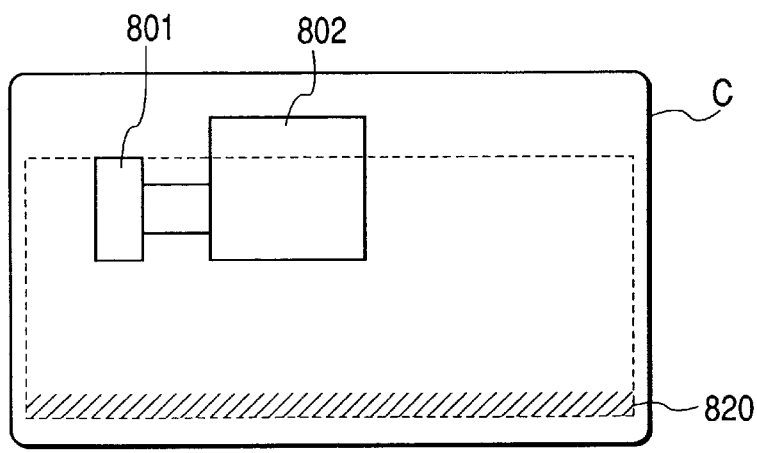
Figure 19B:
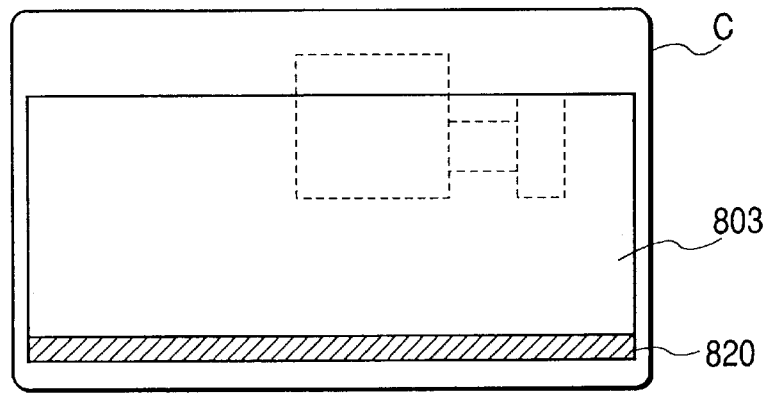

FIGS. 19A and 19B show a hybrid card having a region 820 writing for once information necessary for defining an effective optical recording region. FIG. 19A is a plan view showing the side of the non-contact IC 801 of the hybrid card, where the optical recording region 803 is indicated by dotted lines. FIG. 19B is a plan view showing the side of the optical recording region 803 of the hybrid card, where the non-contact IC 801 and the antenna coil 802 are indicated by dotted lines. The information is recorded in the shaded area 820 located near an end of the information recording tracks of the optical recording region of the card.

Now, the information to be written for once defining an effective optical recording region will be described. The information defines an effective optical recording region and typically includes the track numbers of the two tracks located at the opposite ends of the area where the optical recording region 803 is overlapped by the non-contact IC 801 and/or the antenna coil 802 or those of the two tracks located at the opposite ends of the area where the optical recording region 803 is not overlapped by the non-contact IC 801 and/or the antenna coil 802.

Figure 20:
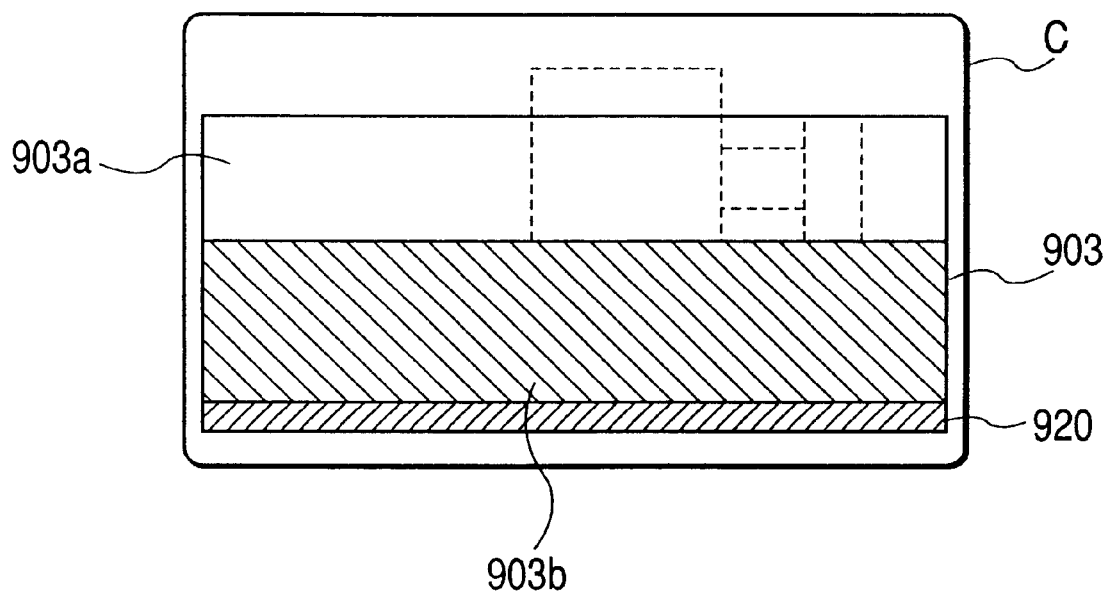

FIG. 20 shows the effective optical recording region 903b defined by the above information (shaded area). Now, the method of accessing the optical recording region by means of an information recording/reproducing apparatus according to the invention according to the information written once on the card will be described.

Referring to FIG. 15, as a hybrid card C is put into the insertion slot 606 of the drive 601, the MPU 603 controls the related components of the drive 601 to transfer the hybrid card C to the right position in it and causes the light spot to irradiate the home position 3 as shown in FIG. 3 to carry out an AF pull-in operation there. Then, the light spot is moved to the recording region 920 on the hybrid card storing the information written once.

The apparatus then obtains data on the track numbers necessary for defining an effective optical recording region from the information reproduced from the recording region 920. Then, the area located between the two tracks having the recorded track numbers and located at the opposite ends of the area where the optical recording region is overlapped by the IC chip and/or the antenna coil is defined as an access-prohibited area so that the area of the optical recording region other than the access-prohibited area is used to record and/or reproduce information. Of course, as pointed out above, the track numbers of the two tracks located at the opposite ends of the area where the optical recording region is not overlapped by the non-contact IC and/or the antenna coil may alternatively be used because the net result will be the same. As a matter of course, it will be understood if the track numbers added once indicate the overlapped area or the unoverlapped area has to be defined in advance. Thus, the information added once may include information (e.g., binary data) indicating if the track numbers added once indicate the overlapped area or the unoverlapped area. With this arrangement, it is now possible for the information recording/reproducing apparatus to accurately record information in or reproduce information from the optical recording region on the basis of only the information written once.

Alternatively, the same information may be written once on a plurality of information recording tracks located near the ends of the group of information recording tracks of the optical recording region. Then, if the attempt of reproducing information from the information recording track accessed first failed, the operation of recording information in or reproducing information from the optical recording region can be conducted accurately by accessing the next information recording track. Since the group of information recording tracks of an optical recording region typically include thousands of tracks, the use of five to ten tracks for storing the information written once will not reduce the memory capacity by more than 1% so that the system will be remain practically intact, while the effect of the information is reliably ensured.

Now, a second method of defining an access-prohibited area by means of information written once will be described below. With this method, data-type determining information is written once in the optical recording region of the hybrid card to indicate that the card is a hybrid card and an access-prohibited area is defined according to this stored information.

Binary data may typically be used for this method, where "1" may indicate that the card is a hybrid card and an access-prohibited area is defined by means of the track numbers stored in the information recording/reproducing apparatus as default values. Note that other mode of writing information once may alternatively be used if such mode is preselected for both the hybrid card and the information recording/reproducing apparatus.

As described above, with the above mode of carrying out an information recording/reproducing system according to the invention and if the card to be used for recording information in or reproducing information from it is a hybrid card, information is recorded in and/or reproduced from an area of the optical recording region where the optical recording region is not overlapped by the antenna coil connected to the IC by means of an optical head. Thus, the optical pickup and the antenna coil would never become aligned in a direction perpendicular to the card so that the risk of adversely affecting the operation of recording information in and/or reproducing information from the non-contact IC to lose, if partly, the information stored in the IC, can be effectively avoided. As a result, there is provided a reliable system for recording information on and reproducing information from a hybrid card comprising both an optical recording region and a non-contact IC region.

With a hybrid card on which a piece of information is written once for defining an effective optical recording region in a predetermined area of the card after the preparation of the card as described above, information can be reliably recorded in and reproduced from an area of the optical recording region other than the area where the optical recording region is overlapped by the non-contact IC and the antenna coil by reproducing the added information so that the AT/AF actuator of the optical head can reliably carry out the operation of recording information in or reproducing information from the optical recording region without being adversely affected by the electromagnetic field generated by the IC recording/reproducing apparatus.

Additionally, from the viewpoint of manufacturing hybrid cards, the need of using a predetermined mold for producing an optical recording region that matches a specific hybrid card is completely eliminated by the present invention so that it is now possible to reduce the cost and raise the rate of manufacturing hybrid cards.

What is claimed is:

1. An apparatus for at least recording information on or reproducing information from a card recording medium having an optical recording region including a track, an IC memory region and a communication antenna coil connected to said IC memory region, said apparatus comprising:

an optical head for irradiating the optical recording region of the medium with a beam of light through an objective lens;

a drive mechanism comprising a coil and a magnet for driving the objective lens along a tracking direction and/or focusing direction;

a control circuit for controlling said drive mechanism in order to exert at least tracking control or focusing control on the beam of light;

an apparatus-side antenna coil arranged opposite to the antenna coil of the medium;

a reader/writer for at least storing information in or reading information from the IC memory region of the medium through transmission of information by means of electromagnetic induction between said antenna coil of the medium and said apparatus-side antenna coil; and a processing circuit for controlling the operation of said optical head, said drive mechanism, said control circuit, and said reader/writer, said processing circuit prohibiting said reader/writer from storing information in or reading information from the IC memory region of the medium during the period where said control circuit is exerting at least tracking control or focusing control on the beam of light.

2. An apparatus according to claim 1, wherein said processing circuit controls said control circuit and said reader/writer such that at least information is stored in or read from the IC memory region when the medium is inserted into the apparatus and, after the completion of storing information in or reading information from the IC memory region when the medium is inserted into the apparatus, at least either tracking control or focusing control is started.

3. A system for at least recording or reproducing information comprising:

a card recording medium including an optical recording region having a plurality of tracks, an IC memory region, and a telecommunication antenna coil connected to said IC memory region, said medium having an area where part of the optical recording region is overlapped by the antenna coil in a direction perpendicular to the surface of the medium;

an optical head for irradiating a converged beam of light on the optical recording region of said medium for at least recording or reproducing information;

a control circuit for exerting at least tracking control or focusing control on the optical beam;

an apparatus-side antenna coil disposed vis-a-vis the antenna coil of said medium;

a reader/writer for at least storing information in or reproducing information from said IC memory region of said medium by way of said apparatus-side antenna coil; and a control circuit for controlling the operation of said optical head so as to at least record information in or reproduce information from an area of the optical recording region of said medium other than the area overlapped by the antenna coil.

4. A system according to claim 3, further comprising:

determining means for determining if said medium has an optical recording region and an IC memory region.

5. A system according to claim 4, wherein said determining means determines if said medium has an optical recording region and an IC memory region by reading identification data stored in advance in said medium.

6. A system according to claim 4, wherein said determining means determines if said medium has an optical recording region and an IC memory region by reading identification data stored in advance in said IC memory region.

7. A system according to claim 3, wherein said processing circuit defines an access-prohibited area in said optical recording region where said optical head is prohibited from recording and reproducing information according to preformatted information in said optical recording region of said medium.

8. A system according to claim 3, wherein said processing circuit defines an access-prohibited area in said optical recording region where said optical head is prohibited from recording and reproducing information according to information stored in said IC memory region.

9. A system according to claim 3, further comprising:

a non-volatile memory, said processing circuit defining an access-prohibited area in said optical recording region where said optical head is prohibited from recording and reproducing information according to information stored in said non-volatile memory.

10. A system according to claim 3, wherein said processing circuit defines an access-prohibited area in said optical recording region where said optical head is prohibited from recording and reproducing information according to information written once on said medium.

11. A system according to claim 10, wherein the information written once is recorded on tracks located closest to an end of said medium out of the plurality of tracks arranged in said optical recording region of said medium.

12. A system according to any of claims 7 through 11, wherein said plurality of tracks of said medium are provided with respective track numbers and the information for defining an access-prohibited area includes the track numbers of several specific tracks.

* * * * *

UNITED STATES PATENT AND TRADEMARK OFFICE
CERTIFICATE OF CORRECTION

PATENT NO. : 6,394,347 B1
DATED : May 28, 2002
INVENTOR(S) : Hiroto Kitai et al.

It is certified that error appears in the above-identified patent and that said Letters Patent is hereby corrected as shown below:

Title page,
Item [56], FOREIGN PATENT DOCUMENTS, "JP 08161790 6/1996" should read -- JP 8-161790 6/1996 --, "EP 525642 2/1993" should read -- EP 0 525 642 2/1993 --, and "EP 678861 10/1995" should read -- EP 0 678 861 10/1993 --.
Item [57], ABSTRACT,
Line 15, "read/writer" should read -- reader/writer --.
Line 17, "there" should read -- where --.

Column 1,
Line 23, "fraudulently" should read -- fraudulently, --.

Column 3,
Line 49, "th" should read -- the --.

Column 7,
Line 23, "signal," should read -- signal --.
Line 24, "signal" should read -- signal, --.
Line 60, "lens a" should read -- lens --.
Line 63, "(±1)" should read -- (+1) --.

Column 8,
Line 24, "entered to" should read -- being entered into --.
Line 43, "and S2" should read -- and S3 --.

Column 9,
Line 66, "output" should read -- outputting --.

Column 14,
Line 47, "both the AF" should read -- both the AT --.

Column 16,
Line 49, "At" should read -- AT --.

Column 18,
Line 11, "of absence" should read -- or absence --.
Line 45, "writing for" should read -- for writing --.
Line 55, "for once" should read -- once for --.

UNITED STATES PATENT AND TRADEMARK OFFICE
CERTIFICATE OF CORRECTION

PATENT NO.     : 6,394,347 B1
DATED          : May 28, 2002
INVENTOR(S)    : Hiroto Kitai et al.

It is certified that error appears in the above-identified patent and that said Letters Patent is hereby corrected as shown below:

<u>Column 19,</u>
Line 48, "be" should be deleted.

Signed and Sealed this

Eighth Day of April, 2003

JAMES E. ROGAN
*Director of the United States Patent and Trademark Office*